US011456764B2

United States Patent
Evtyushkin et al.

(10) Patent No.: US 11,456,764 B2
(45) Date of Patent: Sep. 27, 2022

(54) MULTI-FUNCTION COMMUNICATION DEVICE WITH MILLIMETER-WAVE RANGE OPERATION

(71) Applicant: SAMSUNG ELECTRONICS CO., LTD., Suwon-si (KR)

(72) Inventors: Gennadiy Alexandrovich Evtyushkin, Moscow (RU); Anton Sergeevich Lukyanov, Moscow (RU); Elena Aleksandrovna Shepeleva, Moscow (RU); Artem Yurievich Nikishov, Moscow (RU); Byung Kwan Kim, Suwon-si (KR); Jong-Sok Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 17/031,262

(22) Filed: Sep. 24, 2020

(65) Prior Publication Data

US 2021/0091809 A1    Mar. 25, 2021

(30) Foreign Application Priority Data

Sep. 24, 2019 (RU) ................................ 2019130013
Aug. 20, 2020 (KR) ........................ 10-2020-0104838

(51) Int. Cl.
*H04B 1/04* (2006.01)
*H01Q 5/335* (2015.01)
*H04B 1/00* (2006.01)

(52) U.S. Cl.
CPC ........... *H04B 1/0483* (2013.01); *H01Q 5/335* (2015.01); *H04B 1/006* (2013.01)

(58) Field of Classification Search
CPC . H01Q 5/30; H03H 7/38; H04B 1/005; H04B 1/006; H04B 1/0483
USPC ............ 375/257; 327/396, 401, 403; 333/32
See application file for complete search history.

(56) References Cited

U.S. PATENT DOCUMENTS

| | | | |
|---|---|---|---|
| 5,401,953 | A | 3/1995 | Spencer et al. |
| 5,677,697 | A | 10/1997 | Lee et al. |
| 6,081,232 | A | 7/2000 | Pittman et al. |
| 8,441,964 | B2 | 5/2013 | Wu |
| 8,563,930 | B2 | 10/2013 | Harris et al. |
| 10,283,465 | B2 | 5/2019 | Keeton et al. |

(Continued)

FOREIGN PATENT DOCUMENTS

| | | |
|---|---|---|
| JP | 2005-74644 A | 1/2005 |
| WO | WO 2008/101844 A1 | 8/2008 |

*Primary Examiner* — Young T. Tse
(74) *Attorney, Agent, or Firm* — NSIP Law

(57) ABSTRACT

A communication device includes an input port, a first output port, a second output port, a first output arm including one end connected to the first output port and another end connected to a branch point and including a first switching element configured to be shorted in a second mode, a second output arm including one end connected to the second output port and another end connected to the branch point and including a second switching element configured to be shorted in a first mode, and an input arm including one end connected to the input port and another end connected to the branch point and including a third switching element configured to introduce a discontinuity into a transmission line in the form of a matching element configured to change an impedance of the input arm in a divider mode.

19 Claims, 17 Drawing Sheets

(56) References Cited

U.S. PATENT DOCUMENTS

| | | |
|---|---|---|
| 2004/0090365 A1 | 5/2004 | Newberg et al. |
| 2004/0192222 A1* | 9/2004 | Vaisanen ............... H04B 1/3805 455/78 |
| 2005/0099227 A1* | 5/2005 | Kim ....................... H03F 1/0277 330/51 |
| 2008/0030489 A1* | 2/2008 | Kim ....................... H03M 1/682 345/205 |
| 2011/0309269 A1 | 12/2011 | Shi et al. |
| 2014/0284451 A1 | 9/2014 | Sampayan et al. |
| 2018/0183327 A1* | 6/2018 | Curatolo ................. G11C 5/145 |
| 2018/0212686 A1 | 7/2018 | Adiletta et al. |
| 2019/0086763 A1 | 3/2019 | Makurin et al. |
| 2019/0089396 A1* | 3/2019 | Kim ........................ H03F 3/245 |

* cited by examiner

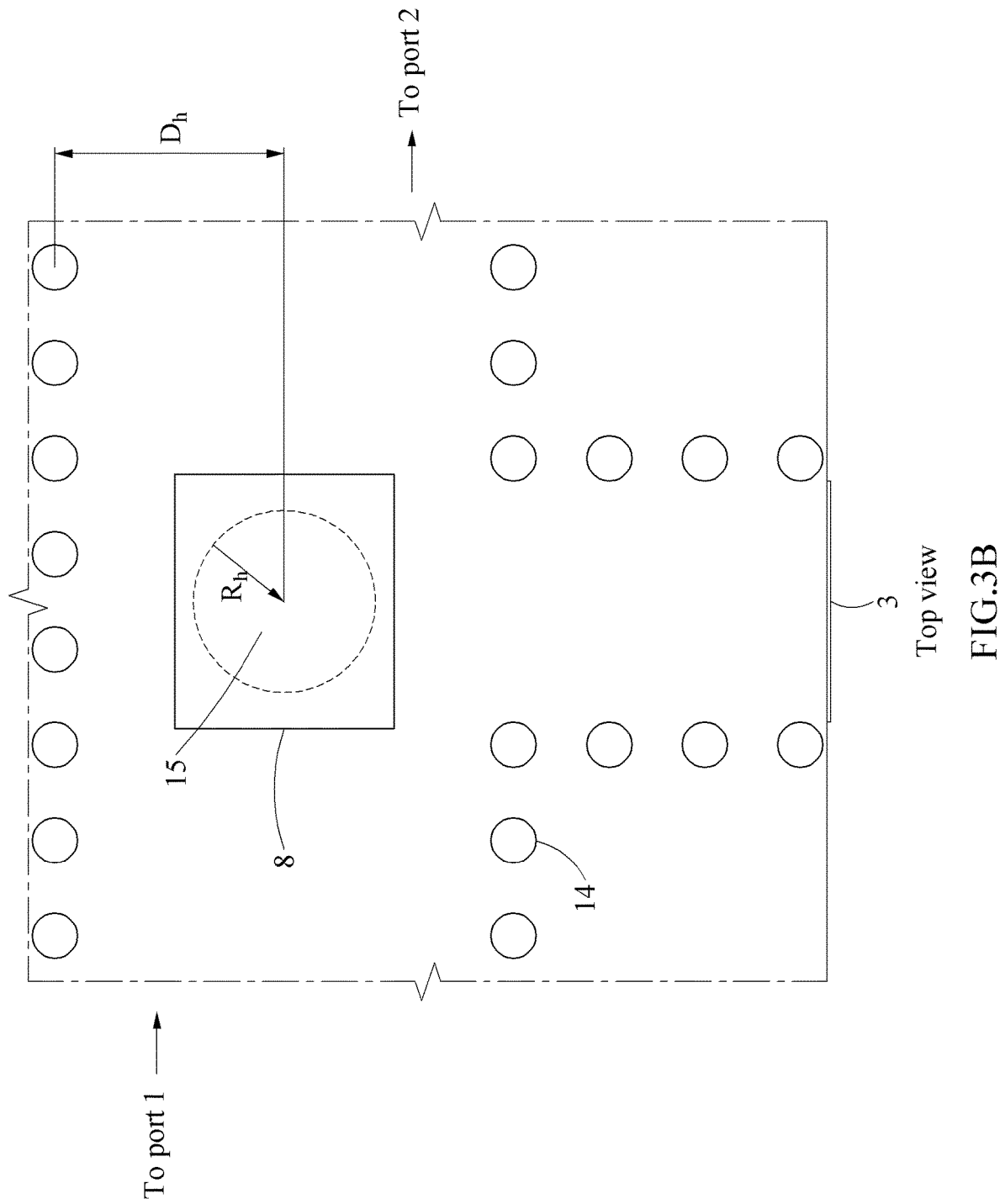

MULTI-FUNCTION COMMUNICATION DEVICE WITH MILLIMETER-WAVE RANGE OPERATION

CROSS-REFERENCE TO RELATED APPLICATIONS

This application claims the benefit under 35 USC § 119(a) of Russian Patent Application No. 2019130013 filed on Sep. 24, 2019, in the Russian Patent Office, and Korean Patent Application No. 10-2020-0104838 filed on Aug. 20, 2020, in the Korean Intellectual Property Office, the entire disclosures of which are incorporated herein by reference for all purposes.

BACKGROUND

1. Field

The following description relates to a multi-function communication device. The following description also relates to a multi-function communication device with millimeter-wave operation.

2. Description of Related Art

Typical millimeter-wave networks and devices, such as 5G and 6G, WiGig (also known as 60 GHz Wi-Fi), automotive radars, and so on, are being developed.

Millimeter-wave commutators may only operate in a single pole double throw (SPDT) mode, in which an input signal passes to one of the output ports, such as to a first port in a first state and to a second port in a second state.

For example, typically in radars, the switching of the signal from the same transmission channel between two antennas is used for selecting between middle range (MR) and short range (SR) modes, where a first antenna may be allocated for the MR mode, and a second antenna may be allocated for the SR. However, such an approach may use an additional space for the second antenna, and these two antennas may be used only in a time division mode (TDM).

Additionally, in a typical feeding device for a smart antenna outputting and feeding signals to two antennas, a switching circuit may perform a switching operation to control electrical connections of a power divider, according to a control signal. The device may allow for distributing input power between an antenna with vertical polarization (VP), an antenna with horizontal polarization (HP), or both such antennae simultaneously, thus providing circular polarization (CP). However, such a device may not be suitable for high frequency applications due to a complicated feeder structure, a large number of lumped elements, and a large number of switching elements.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a communication device includes an input port, a first output port, a second output port, a first output arm including one end connected to the first output port and another end connected to a branch point and including a first switching element configured to be shorted in a second mode, a second output arm including one end connected to the second output port and another end connected to the branch point and including a second switching element configured to be shorted in a first mode, and an input arm including one end connected to the input port and another end connected to the branch point and including a third switching element configured to introduce a discontinuity into a transmission line in the form of a matching element configured to change an impedance of the input arm in a divider mode.

The first switching element may be configured to be shorted to a ground to change the impedance of the first output arm in the second mode to thereby transmit the entire power to the second output arm, and the second switching element may be configured to be shorted to the ground to change the impedance of the second output arm in the first mode to thereby transmit the entire power to the first output arm.

The matching element may have a purely reactive resistance that is opposite in sign and equal in magnitude to a reactive resistance caused by a mismatch of the first output arm and the second output arm in the divider mode.

The input arm may include a transmission line segment connected to the input port and to the matching element and having an impedance $Z_{in}$, each of the first output arm and the second output arm may include two series-connected transmission line segments, the first switching element may be connected at one end to a connection point of the two transmission line segments of the first output arm and at another end to a ground, the second switching element may be connected at one end to a connection point of the two transmission line segments of the second output arm and at another end to the ground, a transmission line segment between the branch point and the connection point of the first switching element may have an impedance $Z_{\lambda/4}$ and an electrical length $\lambda/4$ equivalent to a quarter of the wavelength of a signal passing through the commutator, a transmission line segment between the branch point and the connection point of the second switching element may have the impedance $Z_{\lambda/4}$ and the electrical length $\lambda/4$ equivalent to a quarter of the wavelength of the signal passing through the commutator, and a transmission line segment between the branch point and the connection point of the first switching element and a transmission line segment between the branch point and the connection point of the second switching element may each have an impedance equal to $Z_{in}$.

All of the transmission line segments may be made using a substrate integrated waveguide (SIW), each of the first switching element and the second switching element may include a shunt via, electrically connected to a lower wall of the SIW and separated from an upper wall of the SIW by a dielectric gap, and a photoconductive element, controlled by a light flux completely covering the dielectric gap and electrically connected to the shunt via through an upper wall of the SIW, the matching element may be a hole having a diameter less than $\lambda/4$ in the upper wall of the SIW near the branch point, the third switching element may include the hole, completely covered with the photoconductive element electrically connected to the upper wall of the SIW and controlled by the light flux, and the impedance $Z_{\lambda/4}$ may be equal to $Z_{in}$.

The device may further include at least one additional output port, and at least one additional output arm including one end connected to the additional output port and another end connected to the branch point and including an additional switching element configured to change an impedance of the additional output arm.

The device may be a multi-mode commutator.

In another general aspect, a communication device includes an input port, a first output port, a second output port, a first output arm including one end connected to the first output port and another end connected to a branch point and including a first switching element configured to be shorted in a second mode, a second output arm including one end connected to the second output port and another end connected to the branch point and including a second switching element configured to be shorted in a first mode, and an input arm including one end connected to the input port and another end connected to the branch point and including a third switching element configured to introduce a discontinuity into a transmission line in the form of a matching circuit configured to change an impedance of the input arm in a divider mode.

The first switching element may be configured to be shorted to a ground to change the impedance of the first output arm in the second mode to thereby transmit the entire power to the second output arm, and the second switching element may be configured to be shorted to the ground to change the impedance of the second output arm in the first mode to thereby transmit the entire power to the first output arm.

The matching circuit may have a purely reactive resistance that is opposite in sign and equal in magnitude to a reactive resistance caused by a mismatch of the first output arm and the second output arm in the divider mode.

The input arm may include a transmission line segment connected to the input port and to the matching circuit and having an impedance $Z_{in}$, each of the first output arm and the second output arm may include two series-connected transmission line segments, the first switching element may be connected at one end to a connection point of the two transmission line segments of the first output arm and at another end to a ground, the second switching element may be connected at one end to a connection point of the two transmission line segments of the second output arm and at another end to the ground, a transmission line segment between the branch point and the connection point of the first switching element may have an impedance $Z_{\lambda/4}$ and an electrical length $\lambda/4$ equivalent to a quarter of the wavelength of a signal passing through the commutator, a transmission line segment between the branch point and the connection point of the second switching element may have the impedance $Z_{\lambda/4}$ and the electrical length $\lambda/4$ equivalent to a quarter of the wavelength of the signal passing through the commutator, and a transmission line segment between the branch point and the connection point of the first switching element and a transmission line segment between the branch point and the connection point of the second switching element may have an impedance equal to $Z_{in}$.

All the transmission line segments may be made using a microstrip line, the first switching element and the second switching element may each be made in the form of a gap of the microstrip line, edges of the first switching element and the second switching element may be interconnected by a photoconductive element controlled by a light flux, the matching circuit may include a transmission line segment with an impedance of $Z_{in}$ and an electric length of approximately $0.13\lambda$, and a microstrip stub with an impedance of $2.8Z_{in}$ and an electric length of approximately $0.13\lambda$, the transmission line segment of the matching circuit may be connected at one end to the transmission line segment of the input arm and at another end to the branch point, the microstrip stub of the matching circuit may be connected at one end to the transmission line segment of the input arm and at another end to one end of the third switching element, the third switching element may be connected to the ground at another end of the third switching element, and the impedance $Z_{\lambda/4}$ may be equal to $1.2Z_{in}$.

The device may further include at least one additional output port, and at least one additional output arm including one end connected to the additional output port and another end connected to the branch point and including an additional switching element configured to change an impedance of the additional output arm.

The device may be a multi-mode commutator.

In another general aspect, a communication device includes an input port, N output ports, N output arms, and an input arm including one end connected to the input port and another end, connected to a branch point and including a third switching element configured to introduce a discontinuity into a transmission line in the form of a matching element or matching circuit configured to change an impedance of the input arm in a divider mode, wherein each of the N output arms is connected at one end to a corresponding output port and at another end to the branch point and includes a first switching element configured to change an impedance of a corresponding output arm, and N is a positive integer greater than or equal to 3.

The first switching element may be configured to be shorted to a ground to change the impedance of the corresponding output arm in a mode to thereby transmit the entire power to another output arm.

The matching element or matching circuit may have a purely reactive resistance that is opposite in sign and equal in magnitude to a reactive resistance caused by a mismatch of the first output arm and the second output arm in the divider mode.

The input arm may include a transmission line segment connected to the input port and to the matching element or matching circuit and having an impedance $Z_{in}$, each of the N output arms may include two series-connected transmission line segments, the first switching element may be connected at one end to a connection point of the two transmission line segments of the corresponding output arm and at another end to a ground, a transmission line segment between the branch point and the connection point of the first switching element may have an impedance $Z_{\lambda/4}$ and an electrical length $\lambda/4$ equivalent to a quarter of the wavelength of a signal passing through the commutator, and a transmission line segment between the connection point of the first switching element and the branch point may have an impedance equal to $Z_{in}$.

All of the transmission line segments may be made using a substrate integrated waveguide (SIW), the first switching element may include a shunt via, electrically connected to a lower wall of the SIW and separated from an upper wall of the SIW by a dielectric gap, and a photoconductive element, controlled by a light flux completely covering the dielectric gap and electrically connected to the shunt via through an upper wall of the SIW, the matching element may be a hole having a diameter less than $\lambda/4$ in the upper wall of the SIW near the branch point, the third switching element may include the hole, the hole being completely covered with the photoconductive element electrically connected to the upper wall of the SIW and controlled by the light flux, and the impedance $Z_{\lambda/4}$ may be equal to $Z_{in}$.

All the transmission line segments may be made using a microstrip line, the first switching element may be made in the form of a gap of the microstrip line, edges of the first switching element may be interconnected by a photoconductive element controlled by a light flux, the matching circuit may include a transmission line segment with an impedance of $Z_{in}$ and an electric length of approximately $0.13\lambda$, and a microstrip stub with an impedance of $2.8Z_{in}$ and an electric length of approximately $0.13\lambda$, the transmission line segment of the matching circuit may be connected at one end to the transmission line segment of the input arm and at another end to the branch point, the microstrip stub of the matching circuit may be connected at one end to the transmission line segment of the input arm and at another end to one end of the third switching element, the third switching element may be connected to the ground at another end of the third switching element, and the impedance $Z_{\lambda/4}$ may be equal to $1.2Z_{in}$.

The device may be a base station with an antenna array including the input port, the output ports, the output arms, and the input arm.

In another general aspect, a communication device includes an input port, a first output port, a second output port, a first output arm including one end connected to the first output port and another end connected to a branch point and including a first switching element configured to change an impedance of the first output arm, a second output arm including one end connected to the second output port and another end connected to the branch point and including a second switching element configured to change an impedance of the second output arm, and an input arm including ends connected to the input port and the branch point including a third switching element configured to change an impedance of the input arm, wherein each of the first switching element and the second switching element are configured to be shorted to the ground to change an impedance of the corresponding output arm in a mode of transmitting the entire power to another output arm, the third switching element is configured to introduce a discontinuity into a transmission line in the form of a matching element or matching circuit to change an impedance of the input arm in a divider mode, and the matching element or matching circuit has a purely reactive resistance that is opposite in sign and equal in magnitude to a reactive resistance caused by a mismatch of the first output arm and the second output arm in the divider mode.

In another general aspect, a communication device includes an input port, a first output port, a second output port, a first output arm including one end connected to the first output port and another end connected to a branch point and including a first switching element configured to be shorted in a second mode to thereby transmit the entire power to the second output arm, a second output arm including one end connected to the second output port and another end connected to the branch point and including a second switching element configured to be shorted in a first mode to thereby transmit the entire power to the second output arm, and an input arm connected to the input port and connected to the branch point and including a third switching element configured to change an impedance of the input arm in a divider mode.

The third switching element may be configured to introduce a discontinuity into a transmission line in the form of a matching element configured to change the impedance of the input arm in the divider mode.

The matching element may have a purely reactive resistance that is opposite in sign and equal in magnitude to a reactive resistance caused by a mismatch of the first output arm and the second output arm in the divider mode.

The communication device may further include at least one additional output port, and at least one additional output arm having one end connected to the additional output port and another end connected to the branch point and including an additional switching element configured to change an impedance of the additional output arm.

Other features and aspects will be apparent from the following detailed description, the drawings, and the claims.

BRIEF DESCRIPTION OF THE DRAWINGS

FIGS. 3A and 3B illustrate a structure of a matching switching element located in an input arm of a commutator based on an SIW, according to one or more examples.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
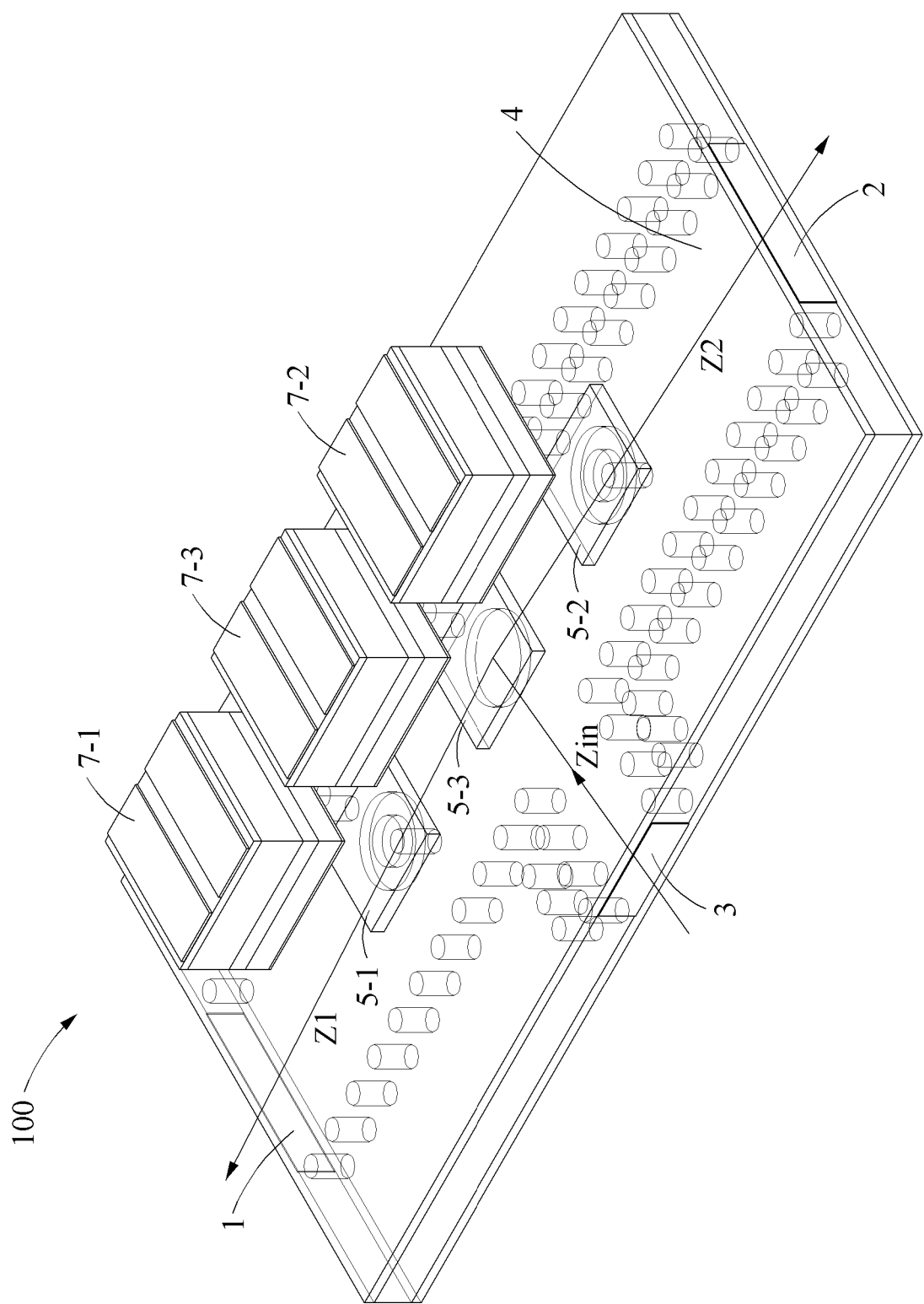
FIG. 1 illustrates a communication device based on a substrate integrated waveguide (SIW), according to one or more examples.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Terms such as "including" or "comprising" used in the embodiments should not be construed as necessarily including all of various components, or various operations described in the specification, and it should be construed that some of the components or some of the operations may not be included or may further include additional components or operations. The use of the term "may" herein with respect to an example or embodiment (e.g., as to what an example or embodiment may include or implement) means that at least one example or embodiment exists where such a feature is included or implemented, while all examples are not limited thereto.

Various modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the examples described above and an element having a common function. Unless otherwise mentioned, the descriptions on the examples may be applicable to the following examples and thus, duplicated descriptions will be omitted for conciseness.

Hereinafter, example embodiments will be described in detail with reference to the accompanying drawings. However, embodiments may be implemented in various forms and should not be construed as being limited to the embodiments set forth herein.

One or more embodiments of the present disclosure may include a high frequency commutator capable of operating in both a single pole double throw (SPDT) switch mode and a power divider mode. The appearance of such new applications in the millimeter-wave range requires the development of a new class of elements and circuits, such as active elements, antennas, printed circuit boards, feeders and switching devices within electronic devices.

In particular, for many applications, for example, for reception/transmission (Rx/Tx) switching, reconfigurable antennas, control of polarization, and so on, a commutator may be a significant component because a commutator may allow for switching of signal propagation channels.

Meanwhile, in view of the above applications, there may be a goal to create millimeter-wave commutators having not only these two modes, but also a divider mode in which the signal passes to both ports simultaneously. Implementation of both types of modes in a single commutator may expand the possibilities for the usage of such a commutator in order to create, for example, an antenna with a controllable beam width and a controllable gain, as well as devices with controlled polarization.

Accordingly, implementing a multi-mode commutator may allow for using a single reconfigurable antenna, thus reducing the space otherwise required for antennas.

Furthermore, with the frequency increasing in antenna implementations, the cost of such devices may increase significantly. Therefore, it may be useful to create simple and inexpensive millimeter-wave commutators with good performance characteristics.

For example, one or more embodiments may include a multi-throw multi-mode commutator in the millimeter-wave range, for example, greater than 40 GHz, as non-limiting examples.

FIG. 1 illustrates an example of a commutator having three modes. The three modes may include a first mode in which an input signal arrives only at a first output port, a second mode in which the input signal arrives only at a second output port, and a divider mode in which the input signal arrives at both output ports.

A commutator 100 as shown in FIG. 1 may have two output ports 1 and 2 and one input port 3 and may be based on a substrate integrated waveguide (SIW) 4. A first output arm of the commutator 100, with its ends connected to the first output port 1 and to a branch point, may include a first switching element 5-1. A second output arm of the commutator 100, with its ends connected to the second output port 2 and to the branch point, may include a second switching element 5-2. An input arm, with its ends connected to the input port 3 and with the branch point, may include a controlled matching element 5-3, which, hereinafter, may also be generally referred to as a switching element 5-3. All three elements 5-1, 5-2, and 5-3 in this example may each be made in the form of an optical switching element based on a photoconductive element (PE). In this example, a control signal for the switching elements may be a light flux, which may be supplied to the switching elements from light sources 7-1, 7-2, and 7-3, such as light emitting diodes (LEDs) or laser diodes, as non-limiting examples. The light sources may be separate components or may alternatively be a part of the commutator 100. Each switching element may be configured to change an impedance of the corresponding arm in which it is located during its activation/deactivation (i.e., turning ON/OFF), as is described in further detail, below.

As mentioned above, all three switching elements in this example may be made on the basis of a printed circuit board and in the form of an optical switching element based on a PE, such as a semiconductor photoconductive element based on silicon, gallium-indium arsenide, and other related materials, as non-limiting examples. A PE may have at least two states: first, a dielectric state having low intrinsic electrical conductivity (OFF state) in the absence of the control light flux; and second, a conductor state having relatively high electrical conductivity (ON state) in the presence of the control light flux.

Figure 2A:
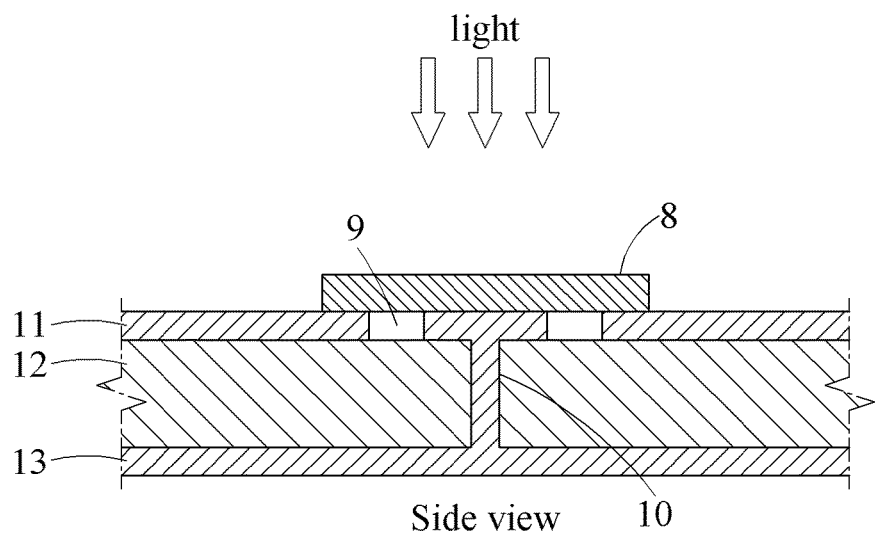
FIGS. 2A and 2B illustrate a structure of optical switching elements located in output arms of a commutator based on an SIW, according to one or more examples.
Figure 2B:
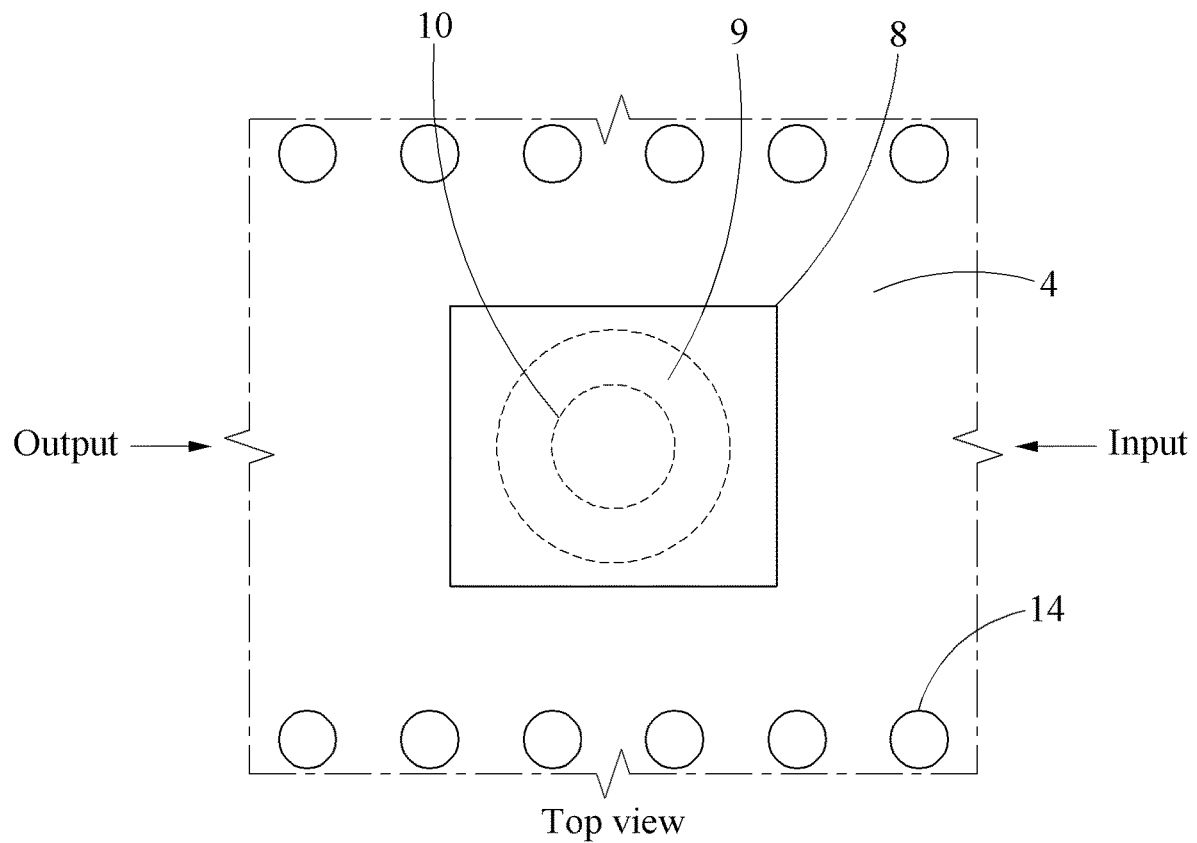

In such an example, the switching elements 5-1 and 5-2 may be known optical switching elements, based on an understanding of the current disclosure, and may include a printed circuit board (PCB) including an upper layer 11, a lower layer 13, and a dielectric layer 12 between the upper layer 11 and the lower layer 13, an outer wall via 14 used for forming a transmission line, a shunt via 10 electrically connected to the lower layer 13 (i.e., to the lower wall of the SIW 4), and separated from the upper layer 11 (i.e., from the upper wall of the SIW 4), by a dielectric gap 9, and a PE 8 located on the upper layer 11 of the PCB and completely covering the dielectric gap 9 and electrically connected to the shunt via 10 and to the upper layer 11 of the PCB, as shown in FIGS. 2A and 2B. FIGS. 2A and 2B illustrate a structure of optical switching elements located in output arms of a commutator based on an SIW, according to one or more examples.

Figure 3A:
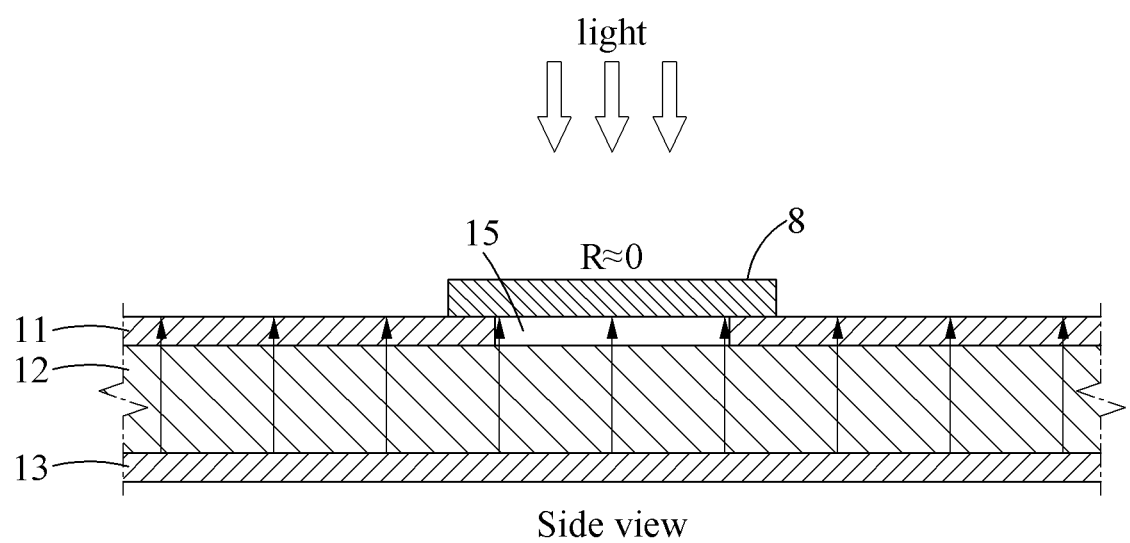

The matching switching element 5-3 may include a hole 15 with a radius $R_h$ completely covered by a PE 8 connected to the upper layer 11 of the PCB, and may be located near the branch point, at a distance $D_h$ from the branch point, as shown in FIGS. 3A and 3B. FIGS. 3A and 3B illustrate a structure of a matching switching element located in an input arm of a commutator based on an SIW, according to one or more examples. The matching switching element 5-3 may also be referred to as a matching hole.

Figure 4A:
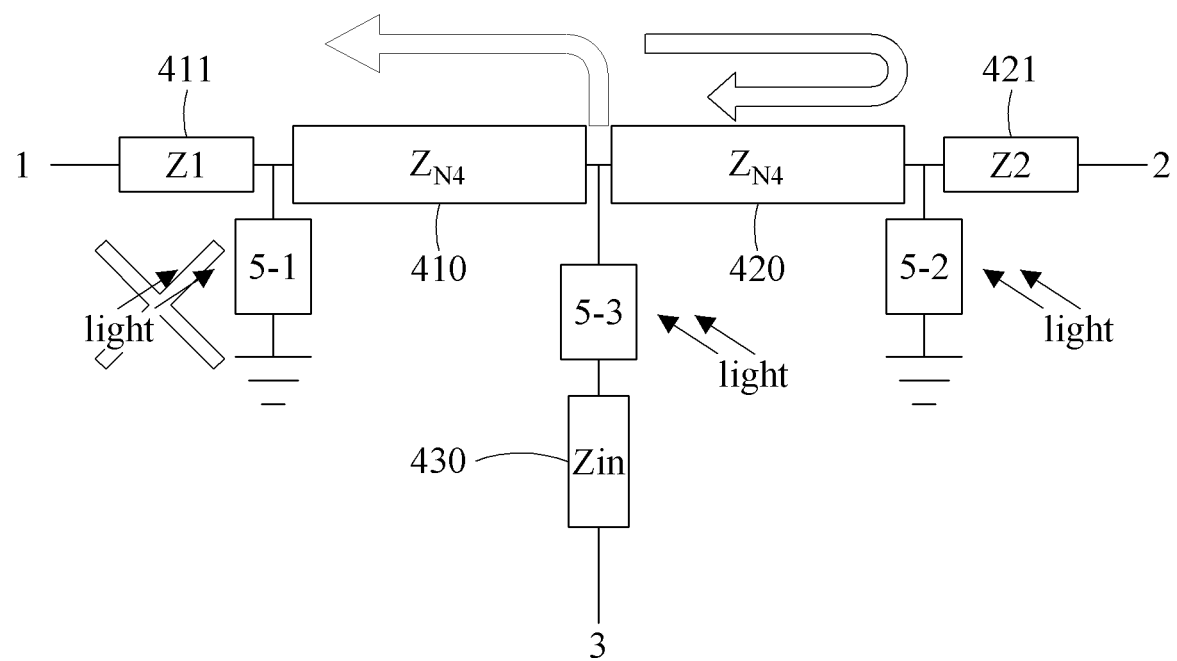
FIGS. 4A and 4B illustrate an operating principle and equivalent circuit of a commutator in a mode of transmitting the entire power to port 1, according to one or more examples.
Figure 4B:
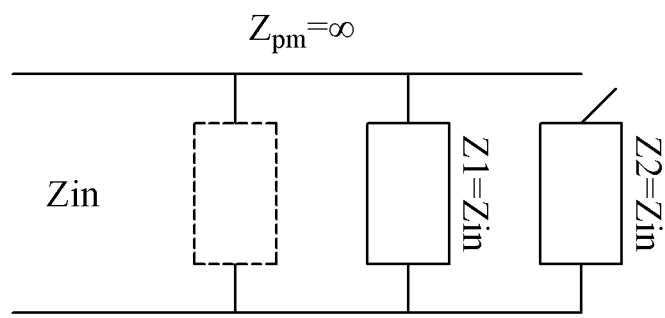
Figure 5A:
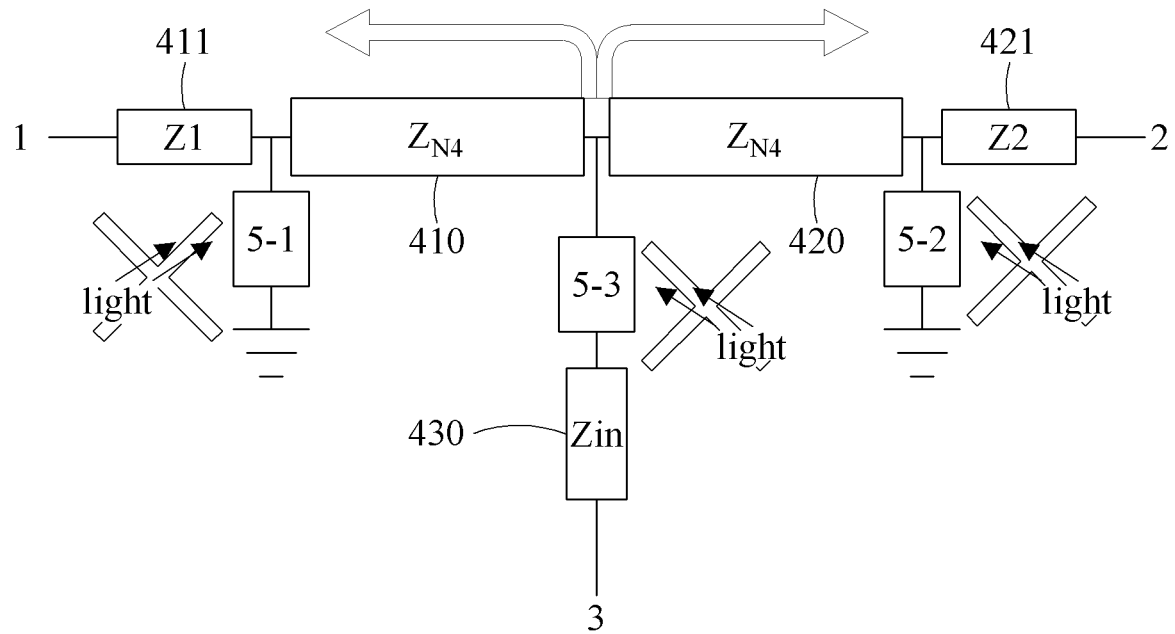
FIGS. 5A and 5B illustrate an operating principle and equivalent circuit of a commutator in a divider mode, according to one or more examples.
Figure 5B:
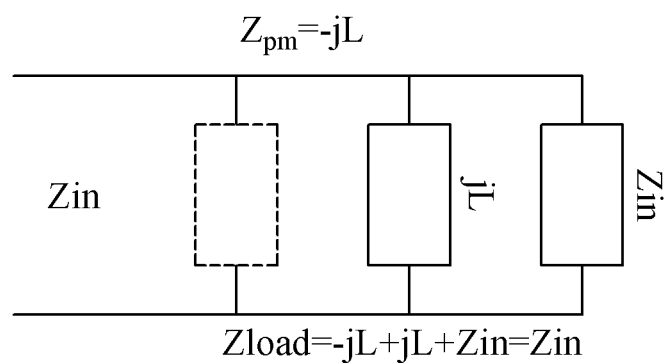

FIGS. 4A and 4B illustrate an operating principle and equivalent circuit of a commutator in a mode of transmitting the entire power to port 1, according to one or more examples. FIGS. 5A and 5B illustrate an operating principle and equivalent circuit of a commutator in a divider mode, according to one or more examples. A transmission line segment 410 in the first output arm between the branch point and a connection point of the switching element 5-1 may have an impedance $Z_{\lambda/4}$ and an electrical length $\lambda/4$ equivalent to a quarter of the wavelength of a signal passing through the commutator. A transmission line segment 420 in the second output arm between the branch point and a connection point of the switching element 5-2 may also have an impedance $Z_{\lambda/4}$ and an electric length $\lambda/4$. It may be understood that the switching elements 5-1 and 5-2 may be connected at one end to the end of the transmission line segment in the corresponding output arm, and connected at the other end to the ground. A transmission line segment 411 in the first output arm between the connection point of the switching element 5-1 and the output port 1 may have an impedance Z1. A transmission line segment 421 in the second output arm between the connection point of the switching element 5-2 and the output port 2 may have an impedance Z2. A transmission line segment 430 in the input arm between the input port 3 and a connection point of the switching element 5-3 may have an impedance $Z_{in}$, matched with each output port, and for this purpose $Z_{\lambda/4}$, Z1, and Z2 in this example are each defined to be equal to $Z_{in}$. The switching element 5-3 in this case may be regarded as being connected at one end to the end of the transmission line segment 430 in the input arm, and at the other end to the branch point. The activation of each of the switching elements may change the impedance of the corresponding arm. Accordingly, the conditions may be implemented both for a single pole double throw (SPDT) mode, when it may be appropriate to output the entire input signal to one output port, and for a divider mode, when it may be appropriate to distribute the signal between the output ports.

For the SPDT mode, the switching element in a desired output port is desired to be deactivated, and the switching element in the other output arm and the switching element in the input arm is desired to be in the activated state. For example, in mode 1 shown in FIGS. 4A and 4B, the light may fall on the optical switching element 5-2 in the second arm, and the PE of the optical switching element 5-2 may be in a conductor state (ON), that is, the switching element 5-2 may be shorted to the ground, and the impedance at this point accordingly becomes zero. Accordingly, the other end of the quarter-wave transmission line segment 420 in the second arm, which is connected to the switching element 5-2, may have an infinite impedance. That is, the other end of the quarter-wave transmission line segment 420 may be in an open mode, such that R=∞ at the branch point. At the same time, the light may not fall on the optical switching element 5-1, and the PE of the optical switching element 5-1 may be in a dielectric state (OFF). That is, a discontinuity may not occur in the first output arm. The light falls on the optical switching element 5-3, and the PE of the optical switching element 5-3 may be in a conductor state (ON), while the matching hole of the switching element 5-3 may be completely shorted to the upper layer of the PCB, that is, to the upper wall of the SIW, and thus may not be an obstacle for the wave, because the entire field is inside the SIW. That is, a discontinuity also may not occur in the input arm, as explained in the above discussion.

Thus, in mode 1, a half power of the electromagnetic wave supplied to input port 3 may pass from the branch point through the first arm, and then, in the absence of a discontinuity in the line, (because the switching element 5-1 is deactivated and the input port is matched, such a half power of the electromagnetic wave completely passes to a load, i.e., to the first output port 1. In turn, the other half of the electromagnetic wave power may pass from the branch point through the transmission line segment 420 in the second arm and may be reflected at the connection point of the switching element 5-2 from the zero impedance, then may go back to the branch point, add in-phase with the first part of the wave and also pass to the first output port 1. In an analogous way, the distribution may be performed in mode 2, in which the switching elements 5-1 and 5-3 are activated, and the switching element 5-2 is deactivated. Accordingly, in mode 1, an entire power may pass to the first output port 1, and in mode 2, an entire power may pass to the second output port 2, e.g., without incurring reflection losses.

For the divider mode, as shown in FIGS. 5A and 5B, all three switching elements may be deactivated. In this example, a discontinuity may not occur in the output arms, and the wave may move to both output arms while have the same wave impedances Z1 and Z2, the sum of which is not equal to $Z_{in}$. That is, a mismatch may occur, and because of this, a reflected wave may arise. The load resistance here may be equal to $Z_{load}=Z_{in}/2$, and at some offset from the branch point the load resistance may be represented as $Z_{load}=jL+Z_{in}$. In such an example, jL may characterize the reactive resistance caused by the mismatch.

Figure 6:
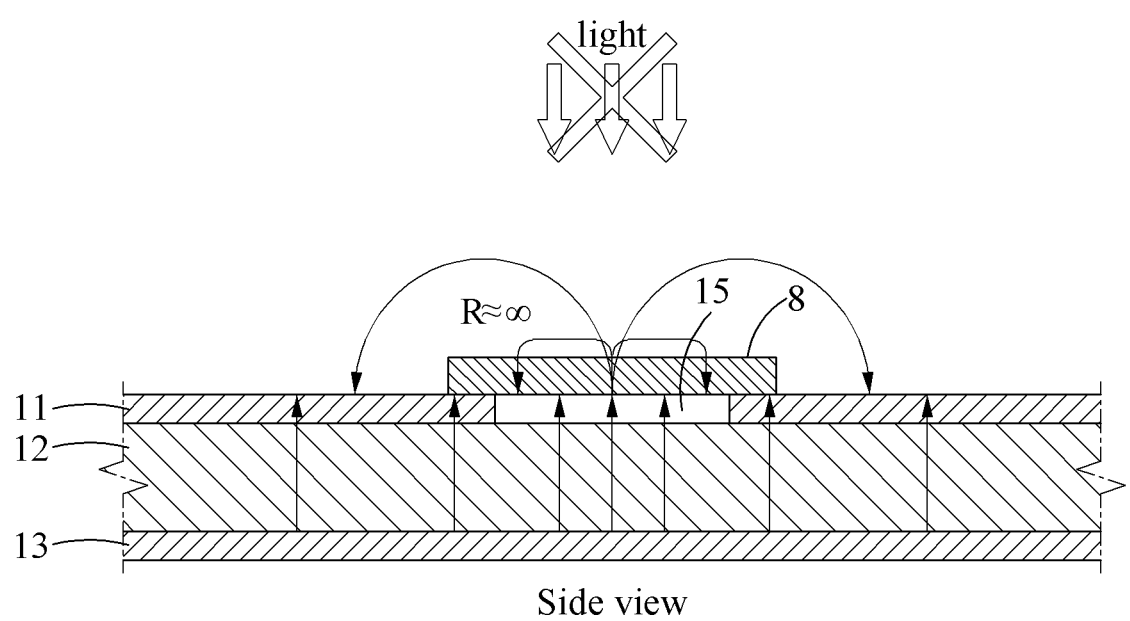
FIG. 6 illustrates an electromagnetic field distribution in an area of a matching switching element in a divider mode, according to one or more examples.

Meanwhile, because the light does not fall on the optical switching element 5-3, the PE 8 of optical switching element 5-3 may be in the dielectric state (OFF), and in predetermined sizes of the matching hole 15 in the upper wall 11 of the SIW 4, the electromagnetic field goes through this hole to the outside, such that the wave is deformed, but not radiated, if the hole 15 is not too large, i.e., the diameter of the hole 15 is less than λ/4, as shown in FIG. 6. FIG. 6 illustrates an electromagnetic field distribution in an area of a matching switching element in a divider mode, according to one or more examples. Such an approach introduces a discontinuity in the transmission line in the form of reactive, more specifically, i.e., inductive, resistance equal to $Z_{PM}=jL$, that is, a resistance equal to the impedance of the input arm changes. An additional reflected wave may occur that may compensate for the reflected wave that may arise as a result of the aforementioned mismatch of the output arms, occurring when these waves are in a counter phase. For complete compensation (i.e., for full matching), the reactive resistance modulo in the input arm may be equal to the reactive resistance modulo jL that is caused by the mismatch of the output arms. Accordingly, in the divider state, due to the occurrence of full matching, the entire power may be equally distributed between the first output port 1 and the second output port 2.

Figure 7A:
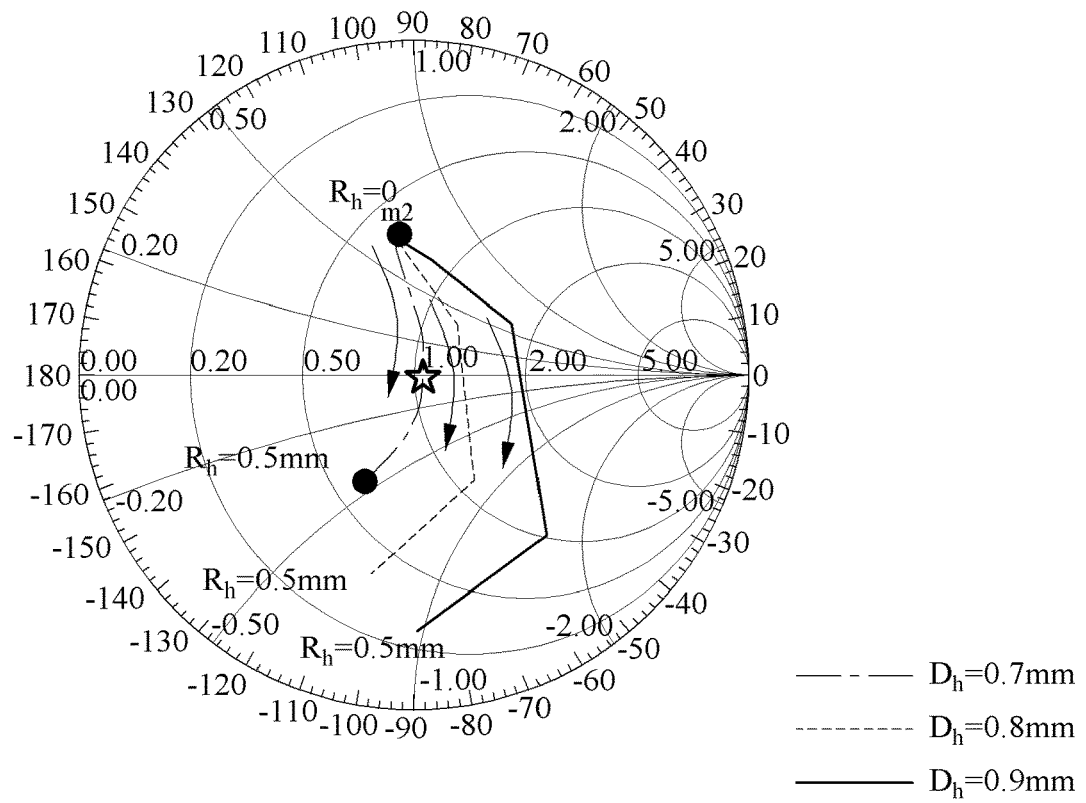
FIGS. 7A and 7B illustrate the dependence of an impedance and a reflection coefficient of an input port on the size of a matching hole and the distance of the hole from a branch point, according to various examples.
Figure 7B:
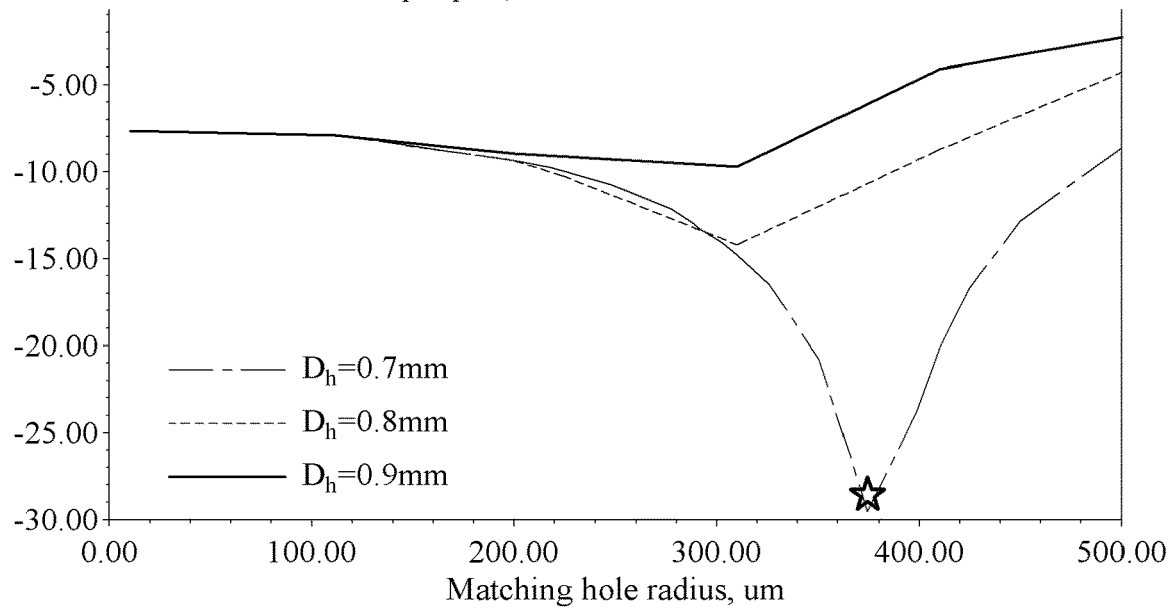

Further, FIGS. 7A and 7B illustrate the dependence of the impedance and the reflection coefficient of the input port on the sizes $R_h$ of the matching hole made within the matching switching element 5-3, and the distance $D_h$ of the matching hole from the branch point, according to various examples. The presented graphs are obtained as a result of simulating the parameters of the output port for different radii $R_h$ of the matching hole and the distance $D_h$ of the matching hole from the branch point. In particular, when $R_h=0$, i.e., there is no hole present, there is no matching in the divider mode, and the reflection may be −8 dB. As seen from what is illustrated in FIGS. 7A and 7B, the optimal combination, as illustrated in FIGS. 7A-7B by an asterisk, for the test sample is the radius $R_h=0.375$ mm and the distance $D_h=0.7$ mm, at which the input port impedance and the reflection coefficient are minimized.

Figure 8A:
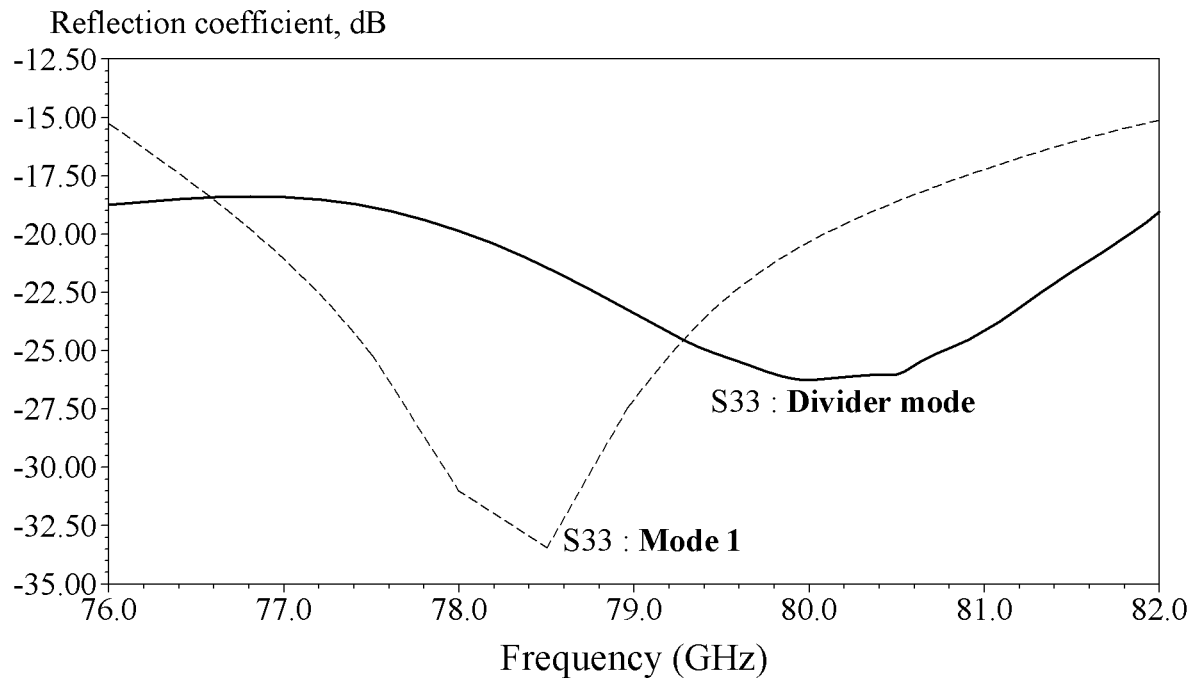
FIGS. 8A and 8B illustrate the results of simulating S-parameters of a multi-mode commutator at a frequency of 79 GHz±3 GHz, according to various examples.
Figure 8B:
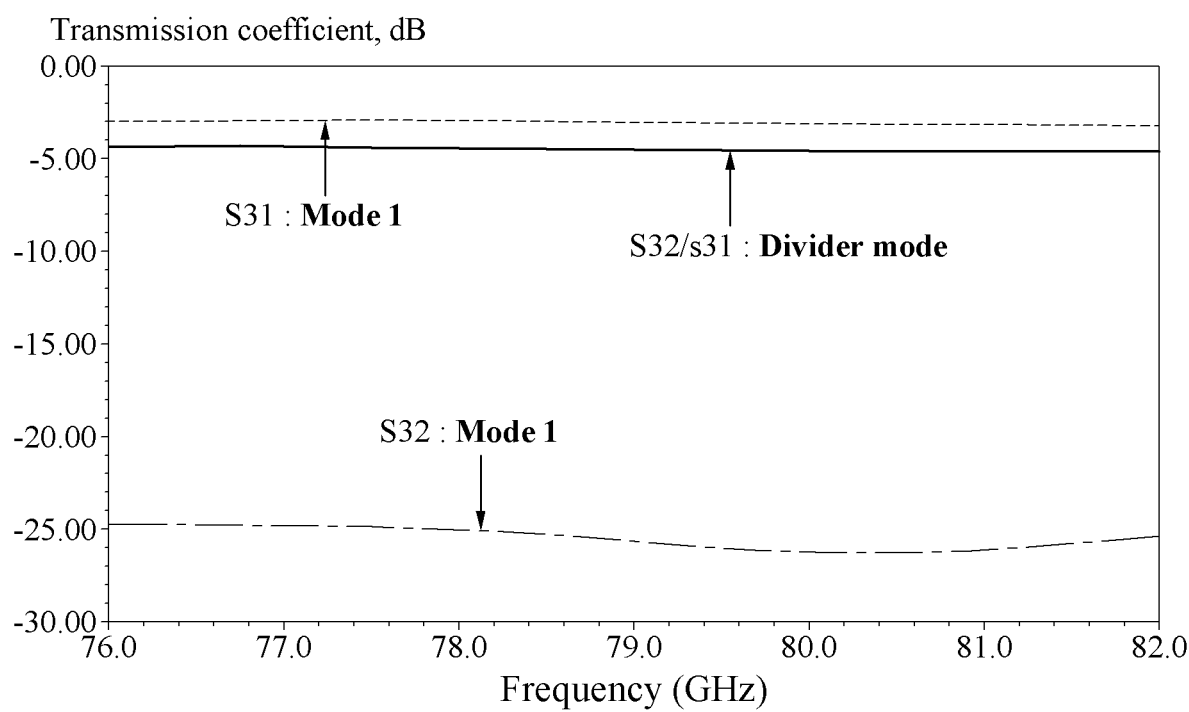

FIGS. 8A and 8B illustrate the results of simulating S-parameters of the multi-mode commutator at a frequency of 79 GHz±3 GHz, according to various examples. Namely, FIG. 8A illustrates graphs of the wave reflection coefficient back into the input port 3 (in example S33) in mode 1 and the divider mode, and FIG. 8B illustrates graphs of the transmission coefficient from the input port to the first output port 1 (in example S31) and to the second output port 2 (in example S32) in mode 1 and the divider mode. As may be seen from the graphs in FIGS. 8A and 8B, in mode 1 the entire signal passes to the first output port 1 such that example S31≈−3 dB, while there is no signal in the second output port 2 and the input port 3, such that example S32≈−25 dB, and example S33<−15 dB. In the divider mode, the entire signal may be distributed equally between the first output port 1 and the second output port 2, such that example S31≈−3 dB, and example S32≈−3 dB, while there is no reflected signal in the input port 3, such that example S33<−18 dB.

For greater ease of understanding, an example operating principle for a commutator of various examples is summarized in the following Table 1.

TABLE 1

| Mode\Element | Port 1 | Port 2 | Switch 5-1 | Switch 5-2 | Matching switch 5-3 |
|---|---|---|---|---|---|
| Divider | −3 dB | −3 dB | OFF | OFF | OFF |
| 1 | 0 dB | — | OFF | ON | ON |
| 2 | — | 0 dB | ON | OFF | ON |

Thus, the commutator 100 may be capable of operating both in the modes of transmitting the entire input power from the input port to any one output port 1 or 2, and in the divider mode in which the input power is distributed to both ports simultaneously. Moreover, even at high frequencies, such a commutator 100 may have low losses and may not be subject to the interference influence of external components. Because of a minimization of the number of components, price reduction and the ability for integration into a compact device may be provided for. Consequently, example structural simplifications of multi-mode commutator examples are compared to typical solutions for the millimeter-wave range, e.g., through examples providing for high performance in terms of losses and available operating frequencies in various embodiments.

Such example solutions may include implementation of a beamforming function for an antenna array and phased antenna array, radiation polarization control, such as VP, HP, and CP, as well as additional features to multiple-input and multiple-output (MIMO) antennas.

Figure 9A:
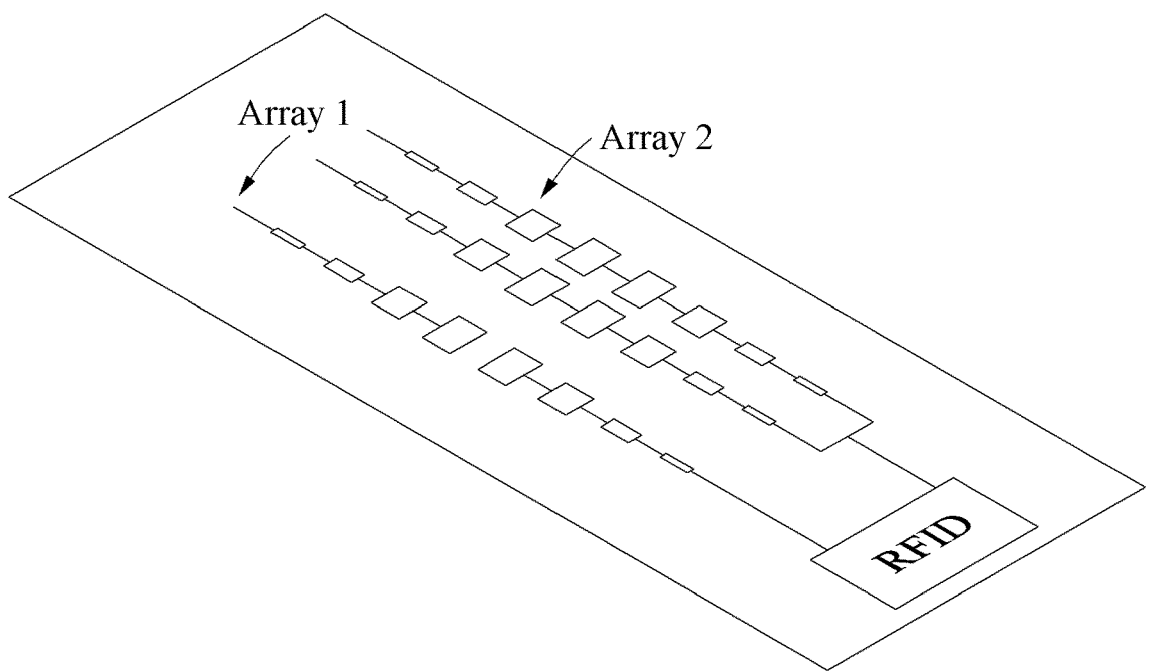
FIG. 9A illustrates a conventional two-antenna radar.
Figure 9B:
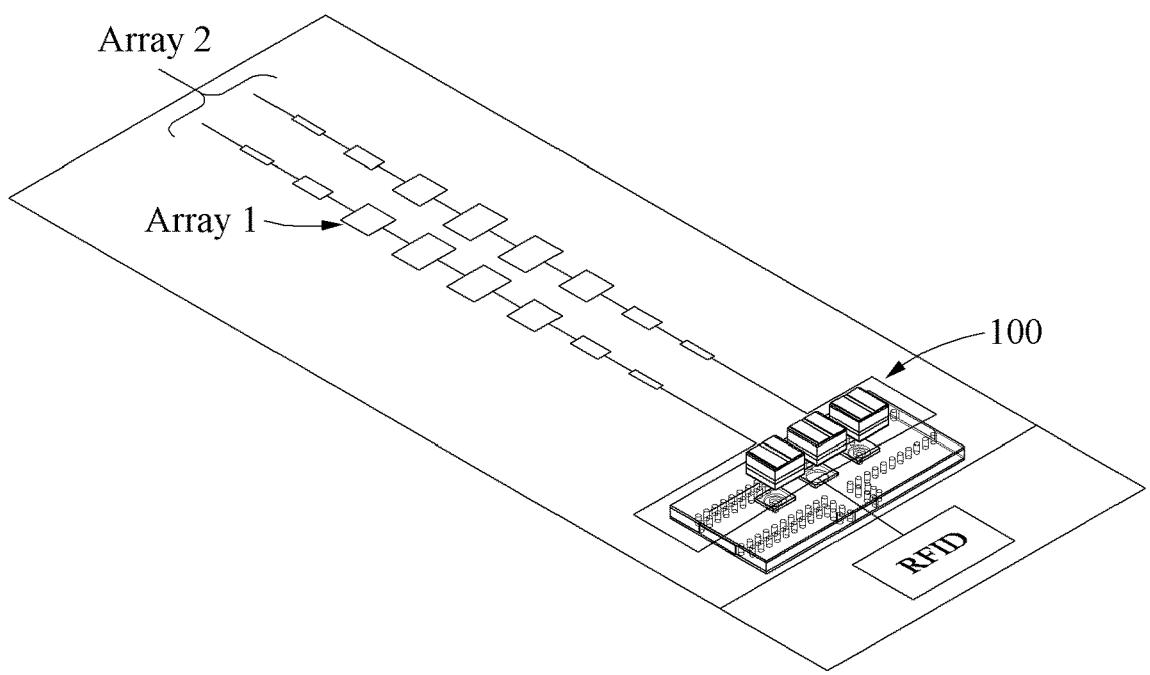
FIG. 9B illustrates a single-antenna radar using a commutator, according to one or more examples.

FIG. 9A illustrates a conventional two-antenna radar. FIG. 9B illustrates a single-antenna radar using a commutator, according to one or more examples. For example, FIGS. 9A and 9B schematically illustrate how it may be possible to reduce the number of antennas used in a radar due to operating in a multi-mode, while maintaining the performance of the antennas and maintaining the ability to switch between range modes. In particular, in the typical radar shown in FIG. 9A, in order to switch between middle range (MR) and short range (SR) modes, a signal may be switched from the same transmitting channel between two antennas. In this example, the first antenna may be used for MR operation, and the second antenna may be used for SR. This typical example uses additional space for the second antenna, and these two antennas may each be used only in a time division mode (TDM). In contrast, in various multi-mode commutators, according to one or more examples, a same antenna array, may be used as shown in FIG. 9B, changing operation partially or completely depending on the selected mode, and thereby reducing the required space for the antennas. For example, in mode 1 of FIG. 9B, only the left part of the antenna array may operate, which is substantially identical to the approach using array 1 from the conventional radar, and in the divider mode, both parts of the antenna array may operate, which is identical to the approach using array 2 from the conventional radar.

Figure 10A:
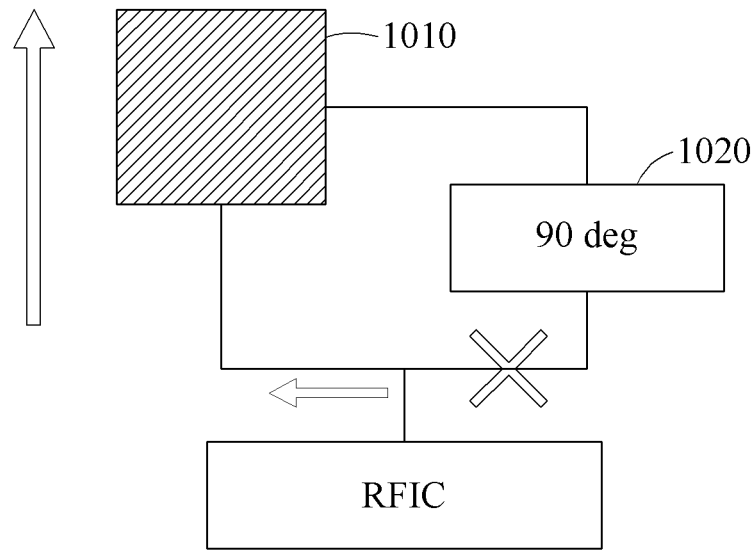
FIGS. 10A to 10C illustrate radiation polarization control using a commutator, according to one or more examples.
Figure 10B:
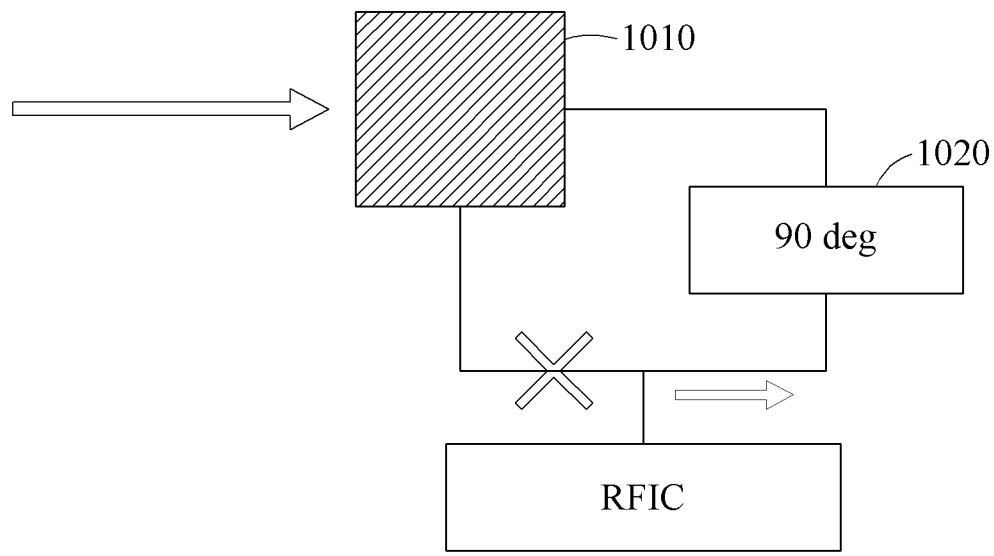
Figure 10C:
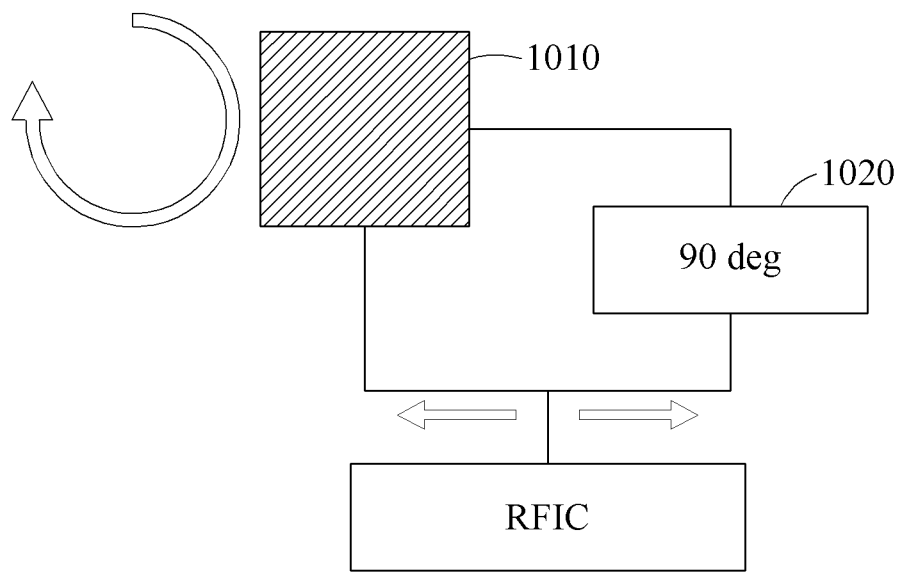

FIGS. 10A to 10C illustrate radiation polarization control using a commutator, according to one or more examples. Further, FIGS. 10A to 10C illustrate how the radiation polarization may be controlled due to multi-mode, according to one or more examples. As one example, the first output port of the commutator may be loaded directly on a radiator 1010, such as a patch radiator, and the second output port may be loaded on the same radiator 1010, but through a −90° phase shifter 1020. In mode 1, the entire power may be provided to the radiator 1010 through the first output port 1, and vertical polarization may be realized. In mode 2, the entire power may pass to the radiator 1010 through the second output port 2 with the −90° phase shifter 1020, and horizontal polarization may be realized. In the divider mode, the power may pass on the radiator 1010 equally through the first output port 1 without phase shift, and through the second output port 2 with the −90° phase shifter 1020, and thus the circular polarization may be realized, accordingly.

Figure 11A:
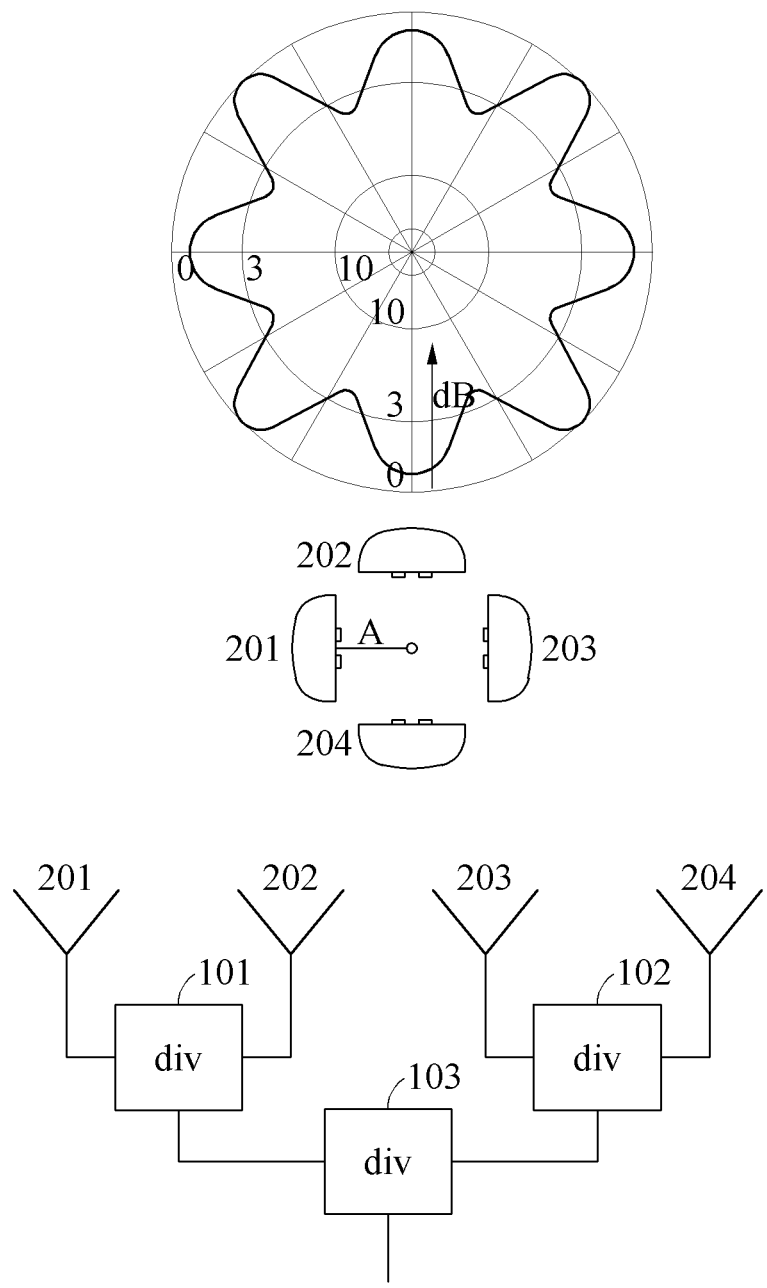
FIGS. 11A to 11C illustrate antenna pattern control at a base station using a commutator, according to one or more examples.
Figure 11B:
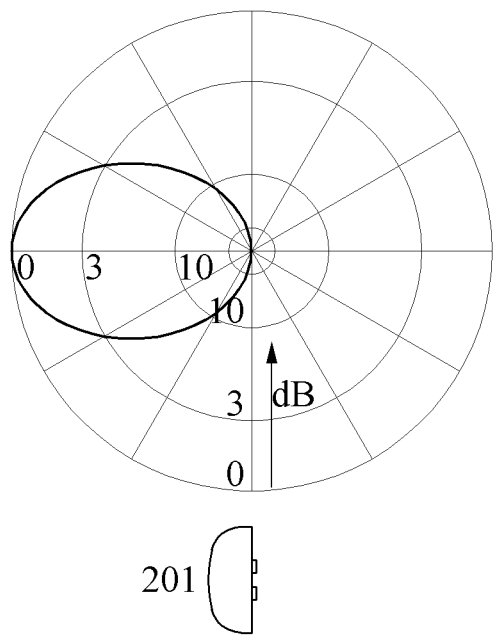
Figure 11B:
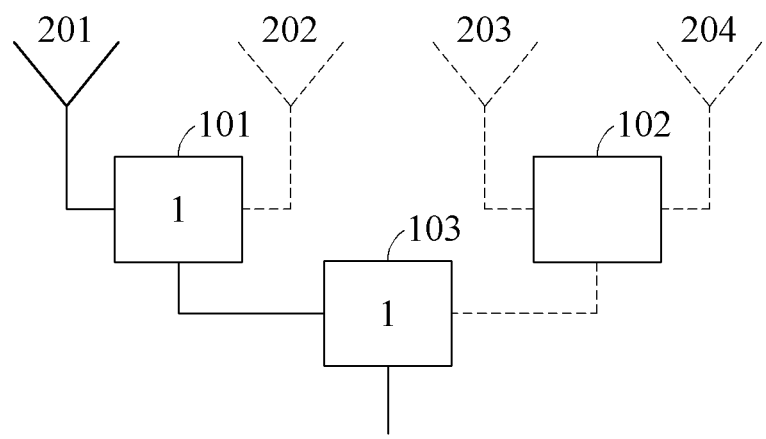
Figure 11C:
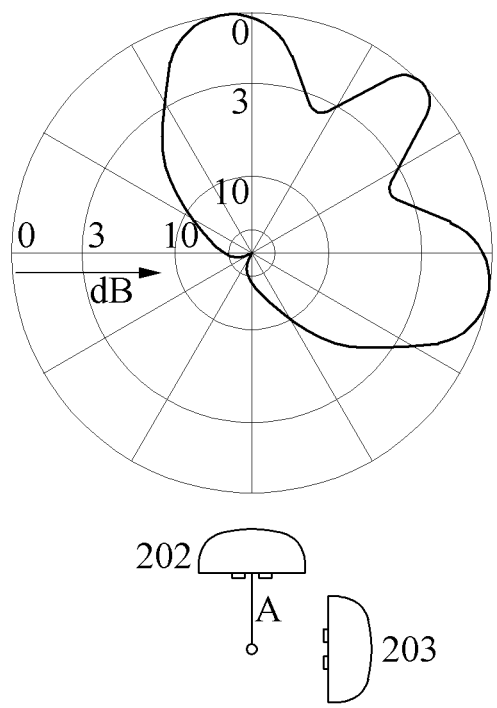
Figure 11C:
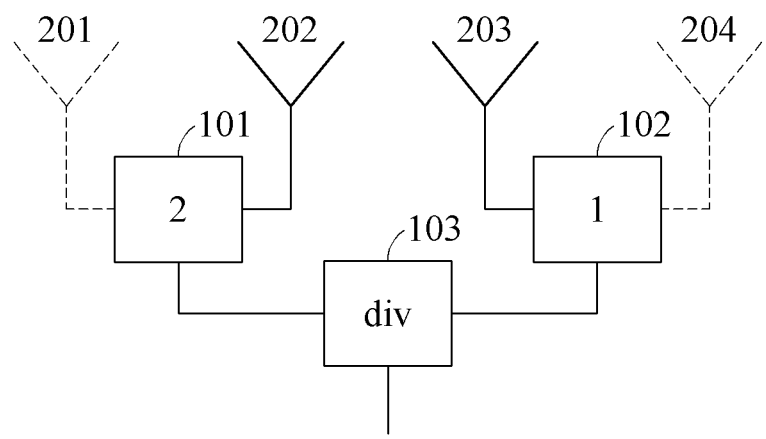

FIGS. 11A to 11C illustrate antenna pattern control at a base station using a commutator, according to one or more examples. Further, FIGS. 11A to 11C illustrate how it is possible to control the radiation pattern in a base station embodiment due to multi-mode, according to one or more examples.

FIG. 11A illustrates a communication device, e.g., a base station, including 4 antennas 201 to 204 evenly spaced around a circle. The power may be provided to the antennas through a power divider having 1 input and 4 outputs and arranged according to a traditional binary circuit structure, in the nodes of which the commutators 101 to 103, proposed in the examples, are located. When all of these commutators operate in the power divider mode in the example base station, the signal may be equally provided to all 4 antennas, and an omnidirectional radiation pattern may be realized as well.

FIG. 11B illustrates the same base station with the same power divider, but in this example, the commutators in the nodes of the power divider may operate in the SPDT mode, in particular, in keeping with the manner in which the commutators 101 and 103 operate in mode 1. The signal may be provided only to the antenna 201, and a narrow radiation pattern generated only by this antenna may be realized, accordingly. Similarly, by controlling the SPDT mode in the switches, it may be possible to obtain scenarios, in which only the antenna 202, 203 or 204 radiates.

FIG. 11C illustrates the same base station with the same power divider, but in this example at least one commutator may operate in the power divider mode and at least one commutator may operate in the SPDT mode. In particular, the commutator 101 may operate in mode 2, the commutator 102 may operate in mode 1, and the commutator 103 may operate in the power divider mode. The signal may be provided only to the antennas 202 and 203, and the corresponding radiation pattern generated only by these antennas may thus be realized. Similarly, by activating the SPDT mode in some commutators and the power divider mode in other commutators, it may be possible to realize scenarios in which 2 antennas, or 3 if necessary, radiate simultaneously.

Figure 12:
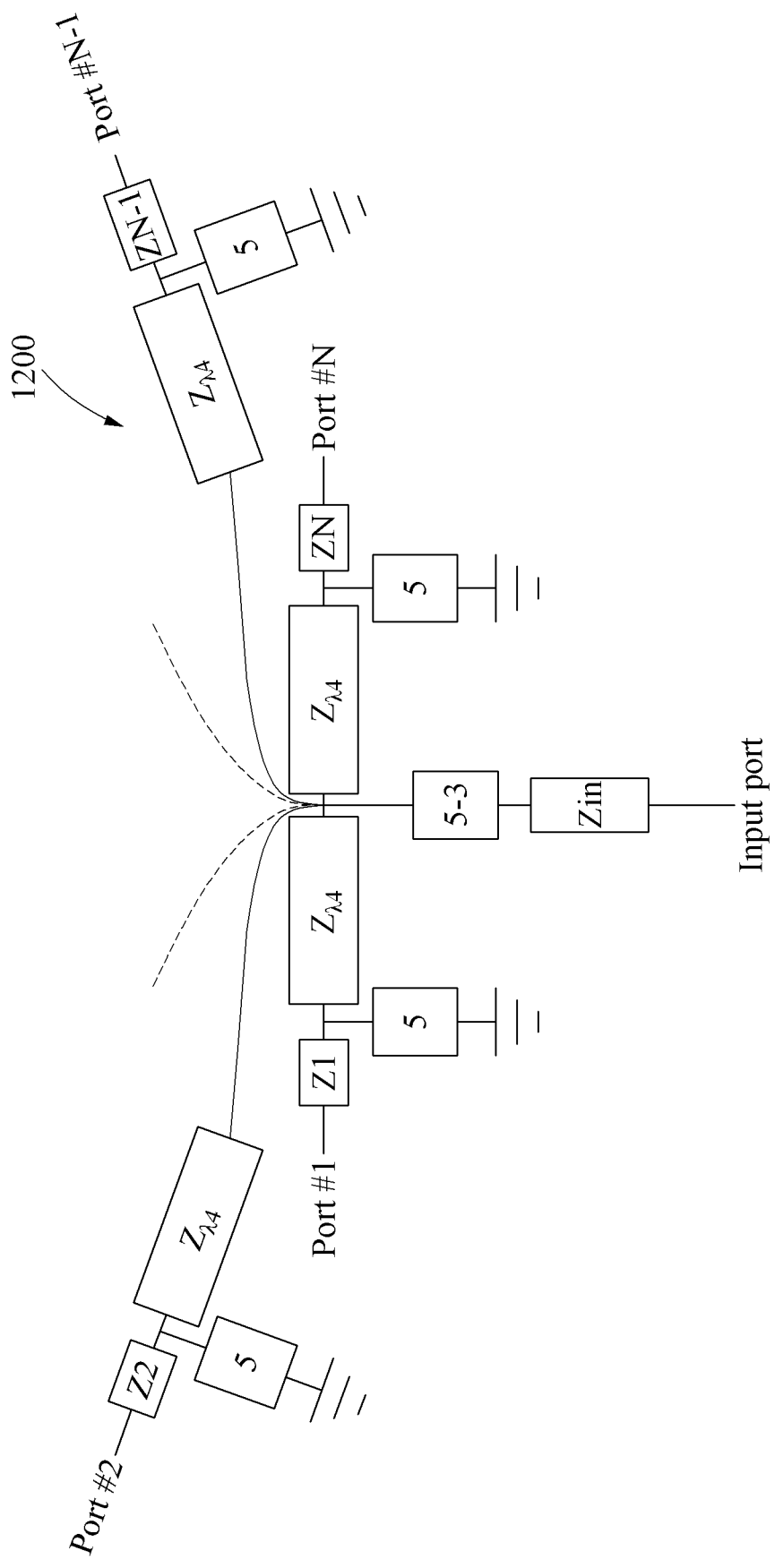
FIG. 12 illustrates a multi-throw commutator, according to one or more examples.

It is to be noted that an SPDT commutator examples have been described above. but examples are not limited to the ability to output signals in 2 channels. Thus, further on with respect to FIG. 12, another example in which a commutator 1200 including N output ports is illustrated. FIG. 12 illustrates a multi-throw commutator, according to one or more examples. A signal from an input port may be separately transmitted when the commutator operates in a single pole multi throw (SPnT) mode. Each of the input and output arms of the commutator 1200 may arranged in the same manner as the input and output arms of the above-described commutator 100. The more arms the commutator includes, the more difficult it may become to achieve matching in a wide frequency band. That is, the operating frequency band of the commutator 1200 may decrease while increasing the N number.

Figure 13A:
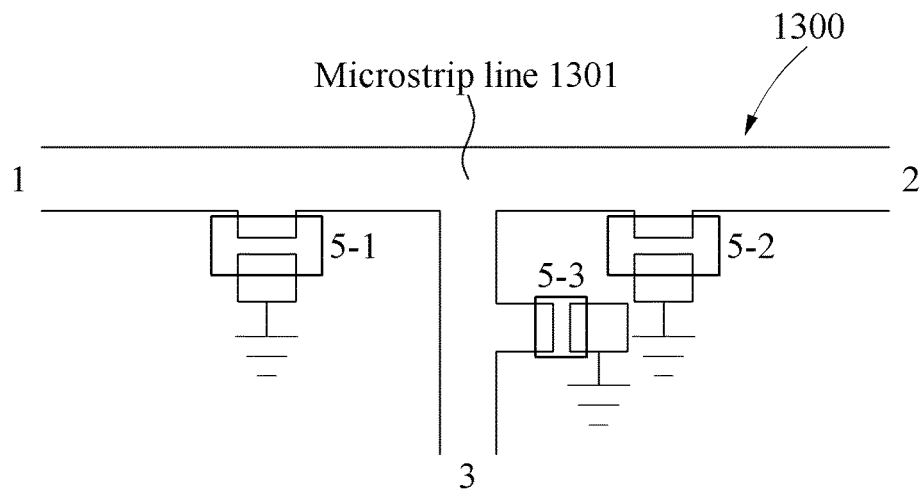
FIGS. 13A and 13B illustrate a microstrip-based commutator, according to one or more examples.
Figure 13B:
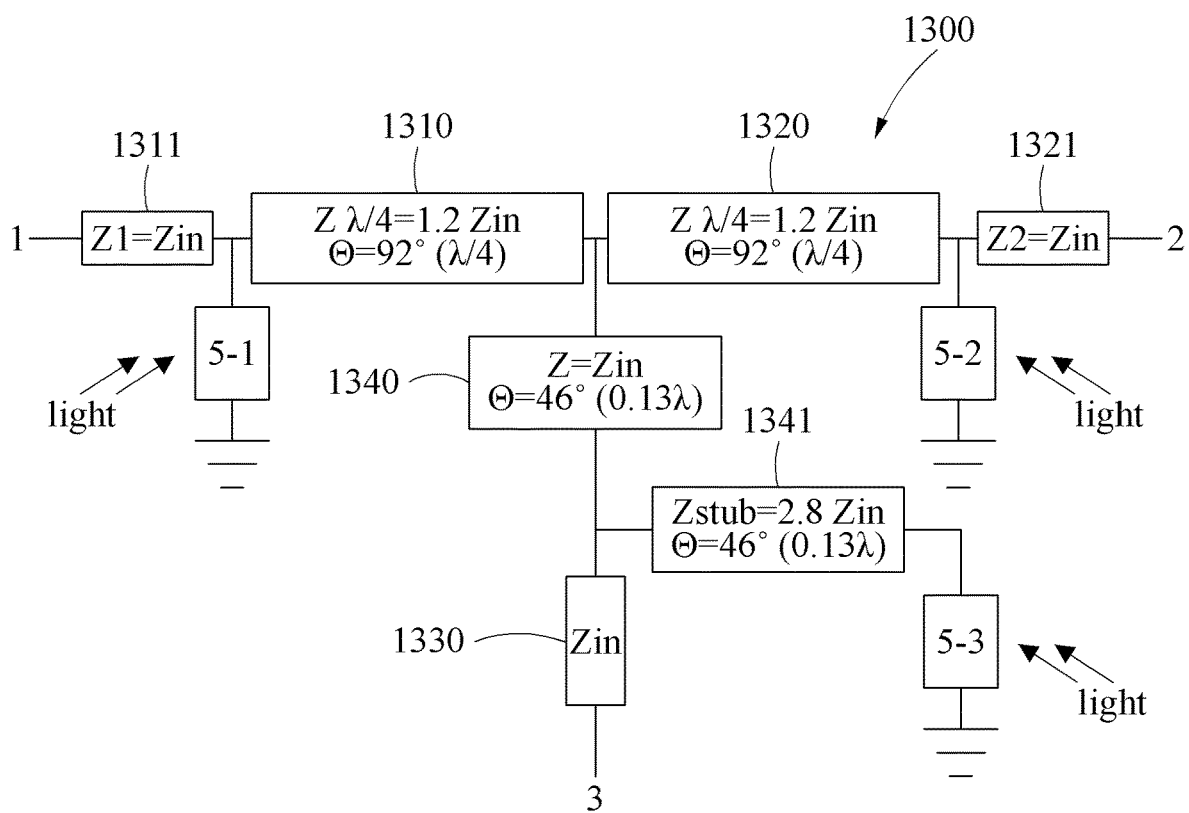

It is also to be noted that the above disclosure describes a non-limiting example, e.g. in which a SIW and a SIW-based optical switching elements are described, however the examples are not limited to such implementations, and other examples are also possible. FIGS. 13A and 13B illustrate a microstrip-based commutator, according to one or more examples. For example, FIGS. 13A and 13B further illustrate still other examples in which a proposed commutator 1300 may be implemented on a microstrip line 1301.

In particular, all transmission line segments in the commutator 1300 may be made on the microstrip line 1301. A transmission line segment 1310 in the first output arm between the branch point and the connection point of the switching element 5-1 may have an impedance $Z_{\lambda/4}=1.2\ Z_{in}$ and may have an electric length λ/4 (92°), e.g., equivalent to approximately a quarter of the wavelength of a signal passing through the commutator 1300. A transmission line segment 1320 in the second output arm between the branch point and the connection point of the switching element 5-2 may also has an impedance $Z_{\lambda/4}=1.2Z_{in}$ and an electric length of approximately λ/4 (92°). The switching elements 5-1 and 5-2 may be connected at one end to the end of the transmission line segment in the corresponding output arm, and may be connected at the other end to the ground. A transmission line segment 1311 in the first output arm between the connection point of the switching element 5-1 and the output port 1 may have an impedance $Z1=Z_{in}$. A transmission line segment 1321 in the second output arm between the connection point of the switching element 5-2 and the output port 2 may have an impedance $Z2=Z_{in}$.

The role of the matching hole in the still another example is performed by a matching circuit, which may also be implemented on the microstrip line 1301. A transmission line segment 1330 in the input arm between the input port 3 and the matching circuit may have an impedance $Z_{in}$ matched with each output port, and for this purpose Z1 and Z2 in this example may be set equal to $Z_{in}$. The matching circuit may include a transmission line segment 1340 having an impedance $Z_{in}$ and an electrical length of approximately 0.13λ (46°), and may include a microstrip stub 1341 with an impedance $Z_{stub}=2.8Z_{in}$ and an electrical length of approximately 0.13λ (46°), wherein the transmission line segment 1340 may be connected at one end to the corresponding transmission line segment 1330 in the input arm and may be connected at the other end to the branch point. The microstrip stub 1341 may be connected at one end to the corresponding transmission line segment 1330 in the input arm and at the other end to the switching element 5-3. In order to provide for matching by the switching element 5-3, in this example, the switching element 5-3 may be connected at one end to the ground, and may be connected at the other end to the mentioned stub of the matching circuit.

The switching elements in this example may be any suitable switches, such as PIN diodes, MEMS elements, and/or optical switching elements. For example, to increase the compactness, the switching elements may be implemented on the basis of PEs. That is, the switching elements may represent a gap in a microstrip line completely covered by a PE to which a control light flux is provided.

The activation of each of the switching elements may change the impedance of the corresponding arm. Thus, the appropriate conditions may be realized both for the SPDT mode in which it is necessary to output the entire input signal to one output port, and for the divider mode in which the signal should be distributed between the output ports. An example of the proposed commutator 1300 on the microstrip line 1301 may also be inexpensive, similar to the related property of SIWs, but due to the fact that the matching circuit may be used in the present example instead of the simple matching hole, the dimensions of the present example may be slightly larger than the above commutator 100, based on SIWs, as an example. Accordingly, it may be advisable to apply such an example when the requirements of a predetermined implementation may impede the possibility of using SIWs, or when the microstrip line is already used in other parts of the device, for example, in a feeder path.

The transmission line segments may be made in a straight shape, in a rounded shape, in a meander shape (i.e., including regular curves or bends) as non-limiting examples, or in any other shape suitable for acting as transmission line segments in a predetermined application.

The transmission line segments may also be made on the basis of using coplanar waveguides, grounded coplanar waveguides, lumped inductive and capacitive elements, and the like, as non-limiting examples.

As in FIG. 12, the commutator 1200 may optionally be implemented as a multi-throw commutator, according to one or more examples.

The communication devices according to the examples may be, or be used in, electronic devices that require control by RF signals. For example, the communication devices may be, or be used in in the millimeter-wave range for mobile communication networks of standards such as 5G and 6G, as well as different sensors, for Wi-Fi networks, with wireless power transmission, smart home systems and other mm-wave adaptive intelligent systems, automobiles with car navigation, an Internet of things (loT) device, a wireless power charging device, and other related devices, as non-limiting examples.

For example, in 5G networks, it may be antenna array of the base station, having antennae such as described above, to control the antenna pattern and beam scanning. In another example, the commutator may find an application for switching between antenna or radar range modes, for example, between long, middle and short range modes, to change the radar resolution, for beam scanning, to switch between antenna modes with respect to the longitudinal/transverse planes, to switch between separated antennas located at different ends of the device, as non-limiting examples as well as for many other applications.

The functionality of the elements specified in the description or the claims as a single element may be implemented in practice through using several components of the device, and vice versa, the functionality of the elements specified in the description or claims as being multiple separate elements may be implemented in practice by using a single component.

In an example, the hardware elements/units of the present commutator may be disposed in a common housing, placed on the same frame/structure/printed circuit board, and connected to each other structurally by mounting/assembly operations and functionally via communication lines. The communication lines or channels, unless specified otherwise, may be conventional communication lines, the material implementation of which may not require unusual creative effort. For example, the communication lines may be wires, sets of wires, buses, paths, wireless communication links (inductive, radio frequency, infrared, ultrasonic, and so on), as non-limiting examples. Communication protocols over the communications links are known in the art and are not disclosed separately.

The functional relationship of elements may be understood as a connection providing correct cooperation of these elements with each other and implementing a particular functionality of elements. Particular examples of such a functional relationship may be a connection providing for exchange of information, a connection providing for transmission of electric current, a connection providing for transfer of mechanical motion, a connection providing for transmission of light, sound, electromagnetic or mechanical vibrations, and so on, as non-limiting examples. The specific form of such a functional relationship may be determined by the nature of interaction of the elements, and, unless otherwise specified, may be provided by known means using the principles known in the art.

Structural examples of elements of the present device are known to those skilled in the art and are not described separately in this document, unless otherwise specified. Elements of the device may be made of any suitable material. Such components may be manufactured using known methods, including, merely by way of example, machining and lost-wax casting. Assembly, connection, and other operations in accordance with the above description may also correspond to the knowledge of the person skilled in the art and, thus will not be explained in greater detail here.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communication device, comprising:
   an input port;
   a first output port;
   a second output port;
   a first output arm comprising one end connected to the first output port and another end connected to a branch point and comprising a first switching element configured to be shorted in a second mode;

a second output arm comprising one end connected to the second output port and another end connected to the branch point and comprising a second switching element configured to be shorted in a first mode; and an input arm comprising one end connected to the input port and another end connected to the branch point and comprising a third switching element configured to introduce a discontinuity into a transmission line in the form of a matching element configured to change an impedance of the input arm in a divider mode.

2. The device of claim 1, wherein the first switching element is configured to be shorted to a ground to change the impedance of the first output arm in the second mode to thereby transmit the entire power to the second output arm, and the second switching element is configured to be shorted to the ground to change the impedance of the second output arm in the first mode to thereby transmit the entire power to the first output arm.

3. The device of claim 1, wherein the matching element has a purely reactive resistance that is opposite in sign and equal in magnitude to a reactive resistance caused by a mismatch of the first output arm and the second output arm in the divider mode.

4. The device of claim 1, wherein the input arm comprises a transmission line segment connected to the input port and to the matching element and having an impedance $Z_{in}$, each of the first output arm and the second output arm comprises two series-connected transmission line segments, the first switching element is connected at one end to a connection point of the two transmission line segments of the first output arm and at another end to a ground, the second switching element is connected at one end to a connection point of the two transmission line segments of the second output arm and at another end to the ground, a transmission line segment between the branch point and the connection point of the first switching element has an impedance $Z_{\lambda/4}$ and an electrical length $\lambda/4$ equivalent to a quarter of the wavelength of a signal passing through a commutator, and a transmission line segment between the branch point and the connection point of the second switching element has the impedance $Z_{\lambda/4}$ and the electrical length $\lambda/4$ equivalent to the quarter of the wavelength of the signal passing through the commutator, wherein the transmission line segment between the branch point and the connection point of the first switching element, and the transmission line segment between the branch point and the connection point of the second switching element each have an impedance equal to $Z_{in}$.

5. The device of claim 4, wherein all of the transmission line segments are made using a substrate integrated waveguide (SIW), each of the first switching element and the second switching element comprises a shunt via, electrically connected to a lower wall of the SIW and separated from an upper wall of the SIW by a dielectric gap, and a photoconductive element, controlled by a light flux completely covering the dielectric gap and electrically connected to the shunt via through the upper wall of the SIW, the matching element is a hole having a diameter less than $\lambda/4$ in the upper wall of the SIW near the branch point, the third switching element comprises the hole, completely covered with the photoconductive element electrically connected to the upper wall of the SIW and controlled by the light flux, and the impedance $Z_{\lambda/4}$ is equal to $Z_{in}$.

6. The device of claim 1, further comprising:

at least one additional output port; and at least one additional output arm comprising one end connected to the additional output port and another end connected to the branch point and comprising an additional switching element configured to change an impedance of the additional output arm.

7. A communication device, comprising:

an input port;

a first output port;

a second output port;

a first output arm comprising one end connected to the first output port and another end connected to a branch point and comprising a first switching element configured to be shorted in a second mode;

a second output arm comprising one end connected to the second output port and another end connected to the branch point and comprising a second switching element configured to be shorted in a first mode; and an input arm comprising one end connected to the input port and another end connected to the branch point and comprising a third switching element configured to introduce a discontinuity into a transmission line in the form of a matching circuit configured to change an impedance of the input arm in a divider mode, wherein in the first mode, all power is transmitted to the first output port, wherein in the second mode, all power is transmitted to the second output port, and wherein in the divider mode, all power is transmitted to the first output port and the second output port.

8. The device of claim 7, wherein the first switching element is configured to be shorted to a ground to change the impedance of the first output arm in the second mode to thereby transmit the entire power to the second output arm, and the second switching element is configured to be shorted to the ground to change the impedance of the second output arm in the first mode to thereby transmit the entire power to the first output arm.

9. The device of claim 7, wherein the matching circuit has a purely reactive resistance that is opposite in sign and equal in magnitude to a reactive resistance caused by a mismatch of the first output arm and the second output arm in the divider mode.

10. The device of claim 7, wherein the input arm comprises a transmission line segment connected to the input port and to the matching circuit and having an impedance $Z_{in}$, each of the first output arm and the second output arm comprises two series-connected transmission line segments, the first switching element is connected at one end to a connection point of the two transmission line segments of the first output arm and at another end to a ground, the second switching element is connected at one end to a connection point of the two transmission line segments of the second output arm and at another end to the ground, a transmission line segment between the branch point and the connection point of the first switching element has an impedance $Z_{\lambda/4}$ and an electrical length $\lambda/4$ equivalent to a quarter of the wavelength of a signal passing through a commutator, and a transmission line segment between the branch point and the connection point of the second switching element has the impedance $Z_{\lambda/4}$ and the electrical length $\lambda/4$ equivalent to the quarter of the wavelength of the signal passing through the commutator, wherein the transmission line segment between the branch point and the connection point of the first switching element, and the transmission line segment between the branch point and the connection point of the second switching element have an impedance equal to $Z_{in}$.

11. The device of claim 10, wherein all the transmission line segments are made using a microstrip line, the first switching element and the second switching element are each made in the form of a gap of the microstrip line, edges of the first switching element and the second switching element are interconnected by a photoconductive element controlled by a light flux, the matching circuit comprises:

a transmission line segment with the impedance of $Z_{in}$ and an electric length of approximately $0.13\lambda$; and a microstrip stub with an impedance of $2.8Z_{in}$ and an electric length of approximately $0.13\lambda$, the transmission line segment of the matching circuit is connected at one end to the transmission line segment of the input arm and at another end to the branch point, the microstrip stub of the matching circuit is connected at one end to the transmission line segment of the input arm and at another end to one end of the third switching element, the third switching element is connected to the ground at another end of the third switching element, and the impedance $Z_{\lambda/4}$ is equal to $1.2Z_{in}$.

12. The device of claim 7, further comprising:

at least one additional output port; and at least one additional output arm comprising one end connected to the additional output port and another end connected to the branch point and comprising an additional switching element configured to change an impedance of the additional output arm.

13. A communication device, comprising:

an input port;

N output ports;

N output arms; and an input arm comprising one end connected to the input port and another end, connected to a branch point and comprising a third switching element configured to introduce a discontinuity into a transmission line in the form of a matching element or matching circuit configured to change an impedance of the input arm in a divider mode, wherein each of the N output arms is connected at one end to a corresponding output port and at another end to the branch point and comprises a first switching element configured to change an impedance of a corresponding output arm, and wherein N is a positive integer greater than or equal to 3.

14. The device of claim 13, wherein the first switching element is configured to be shorted to a ground to change the impedance of the corresponding output arm in a mode to thereby transmit an entire power to another output arm.

15. The device of claim 13, wherein the matching element or matching circuit has a purely reactive resistance that is opposite in sign and equal in magnitude to a reactive resistance caused by a mismatch of a first output arm and a second output arm of the N output arms in the divider mode.

16. The device of claim 13, wherein the input arm comprises a transmission line segment connected to the input port and to the matching element or matching circuit and having an impedance $Z_{in}$, each of the N output arms comprises two series-connected transmission line segments, the first switching element is connected at one end to a connection point of the two transmission line segments of the corresponding output arm and at another end to a ground, a transmission line segment between the branch point and the connection point of the first switching element has an impedance $Z_{\lambda/4}$ and an electrical length $\lambda/4$ equivalent to a quarter of the wavelength of a signal passing through a commutator, and a transmission line segment between the connection point of the first switching element and the branch point has an impedance equal to $Z_{in}$.

17. The device of claim 16, wherein all of the transmission line segments are made using a substrate integrated waveguide (SIW), the first switching element comprises a shunt via, electrically connected to a lower wall of the SIW and separated from an upper wall of the SIW by a dielectric gap, and a photoconductive element, controlled by a light flux completely covering the dielectric gap and electrically connected to the shunt via through the upper wall of the SIW, the matching element is a hole having a diameter less than $\lambda/4$ in the upper wall of the SIW near the branch point, the third switching element comprises the hole, the hole being completely covered with the photoconductive element electrically connected to the upper wall of the SIW and controlled by the light flux, and the impedance $Z_{\lambda/4}$ is equal to $Z_{in}$.

18. The device of claim 16, wherein all the transmission line segments are made using a microstrip line, the first switching element is made in the form of a gap of the microstrip line, edges of the first switching element are interconnected by a photoconductive element controlled by a light flux, the matching circuit comprises:

a transmission line segment with the impedance of $Z_{in}$ and an electric length of approximately $0.13\lambda$; and a microstrip stub with an impedance of $2.8Z_{in}$ and an electric length of approximately $0.13\lambda$, the transmission line segment of the matching circuit is connected at one end to the transmission line segment of the input arm and at another end to the branch point, the microstrip stub of the matching circuit is connected at one end to the transmission line segment of the input arm and at another end to one end of the third switching element, the third switching element is connected to the ground at another end of the third switching element, and the impedance $Z_{\lambda/4}$ is equal to $1.2Z_{in}$.

19. A communication device, comprising:

an input port;

a first output port;

a second output port;

a first output arm comprising one end connected to the first output port and another end connected to a branch point and comprising a first switching element configured to change an impedance of the first output arm;

a second output arm comprising one end connected to the second output port and another end connected to the branch point and comprising a second switching element configured to change an impedance of the second output arm; and an input arm comprising ends connected to the input port and another end connected to the branch point and comprising a third switching element configured to change an impedance of the input arm, wherein each of the first switching element and the second switching element is configured to be shorted to the ground to change an impedance of the corresponding output arm in a mode of transmitting an entire power to another output arm, wherein the third switching element is configured to introduce a discontinuity into a transmission line in the form of a matching element or matching circuit to change an impedance of the input arm in a divider mode, and wherein the matching element or matching circuit has a purely reactive resistance that is opposite in sign and equal in magnitude to a reactive resistance caused by a mismatch of the first output arm and the second output arm in the divider mode.

* * * * *